US011574392B2

(12) United States Patent
Lin et al.

(10) Patent No.: US 11,574,392 B2
(45) Date of Patent: Feb. 7, 2023

(54) AUTOMATICALLY MERGING PEOPLE AND OBJECTS FROM MULTIPLE DIGITAL IMAGES TO GENERATE A COMPOSITE DIGITAL IMAGE

(71) Applicant: Adobe Inc., San Jose, CA (US)

(72) Inventors: Zhe Lin, Fremont, CA (US); Vipul Dalal, Cupertino, CA (US); Vera Lychagina, San Jose, CA (US); Shabnam Ghadar, Menlo Park, CA (US); Saeid Motiian, San Francisco, CA (US); Rohith mohan Dodle, Fremont, CA (US); Prethebha Chandrasegaran, Fremont, CA (US); Mina Doroudi, San Francisco, CA (US); Midhun Harikumar, Santa Clara, CA (US); Kannan Iyer, San Ramon, CA (US); Jayant Kumar, San Jose, CA (US); Gaurav Kukal, Fremont, CA (US); Daniel Miranda, San Jose, CA (US); Charles R McKinney, Aptos, CA (US); Archit Kalra, Fremont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/803,332

(22) Filed: Feb. 27, 2020

(65) Prior Publication Data

US 2021/0272253 A1 Sep. 2, 2021

(51) Int. Cl.
*G06K 9/62* (2022.01)
*G06V 40/16* (2022.01)
(Continued)

(52) U.S. Cl.
CPC .............. *G06T 5/50* (2013.01); *G06K 9/6215* (2013.01); *G06K 9/6267* (2013.01); *G06T 7/11* (2017.01);
(Continued)

(58) Field of Classification Search
CPC ... G06T 11/60; G06T 7/11; G06T 7/70; G06T 7/73; G06T 2207/10004;
(Continued)

(56) References Cited

U.S. PATENT DOCUMENTS 8,041,076 B1 * 10/2011 Bourdev ............ H04N 5/23219
382/103
10,027,727 B1 * 7/2018 Ozog ................. G06K 9/00926
(Continued)

FOREIGN PATENT DOCUMENTS

GB 2563136 A * 12/2018 ......... G06K 9/00362

OTHER PUBLICATIONS

Chuyang Li et al., "Perfect Group Photo Synthesis", 2015 International Conference on Virtual Reality and Visualization, pp. 46-50 (Year: 2015).*

*Primary Examiner* — Chante E Harrison
(74) *Attorney, Agent, or Firm* — Keller Preece PLLC

(57) ABSTRACT

The present disclosure relates to an image merging system that automatically and seamlessly detects and merges missing people for a set of digital images into a composite group photo. For instance, the image merging system utilizes a number of models and operations to automatically analyze multiple digital images to identify a missing person from a base image, segment the missing person from the second image, and generate a composite group photo by merging the segmented image of the missing person into the base (Continued)

image. In this manner, the image merging system automatically creates merged group photos that appear natural and realistic.

20 Claims, 19 Drawing Sheets

(51) Int. Cl.
  *G06T 5/50* (2006.01)
  *G06T 7/11* (2017.01)
  *G06T 7/70* (2017.01)
(52) U.S. Cl.
  CPC ............. *G06T 7/70* (2017.01); *G06V 40/161* (2022.01); *G06V 40/168* (2022.01); *G06T 2207/20221* (2013.01); *G06T 2207/30196* (2013.01)
(58) Field of Classification Search
  CPC . G06T 2207/10016; G06T 2207/20021; G06T 2207/20221; G06T 2207/30168; G06T 2207/30196; G06T 2207/30201; G06T 5/005; G06T 5/50; G06T 3/4038; G06T 2210/12; G06K 9/0061; G06K 9/00221; G06K 9/00228; G06K 9/00248; G06K 9/00281; G06K 9/00288; G06K 9/00268; G06K 9/00744; G06K 9/6215; G06K 9/6267; G06K 9/6218; H04N 5/23219; G06V 40/161; G06V 40/165; G06V 40/168; G06V 40/173; G06V 10/761
  See application file for complete search history.

(56) References Cited

U.S. PATENT DOCUMENTS

| | | | | |
|---|---|---|---|---|
| 2005/0036044 | A1* | 2/2005 | Funakura | H04N 5/272 348/239 |
| 2008/0291214 | A1* | 11/2008 | Wasserman | H04N 5/272 345/619 |
| 2009/0135269 | A1* | 5/2009 | Nozaki | H04N 5/23219 348/222.1 |
| 2009/0244296 | A1* | 10/2009 | Petrescu | H04N 5/23219 348/207.99 |
| 2009/0262213 | A1* | 10/2009 | Watanabe | G06K 9/00295 348/222.1 |
| 2011/0268369 | A1* | 11/2011 | Richards | G06T 7/97 382/284 |
| 2012/0120273 | A1* | 5/2012 | Amagai | H04N 5/247 348/222.1 |
| 2014/0337697 | A1* | 11/2014 | Ryu | H04L 67/06 715/205 |
| 2015/0009359 | A1* | 1/2015 | Zaheer | G06T 3/4038 348/223.1 |
| 2015/0304566 | A1* | 10/2015 | Seo | H04N 5/23216 348/222.1 |
| 2016/0065861 | A1* | 3/2016 | Steinberg | H04N 5/232933 348/239 |
| 2016/0066034 | A1* | 3/2016 | Hicks | H04H 60/33 725/12 |
| 2017/0032178 | A1* | 2/2017 | Henry | G06K 9/00308 |
| 2018/0367752 | A1* | 12/2018 | Donsbach | H04N 19/136 |
| 2019/0037135 | A1* | 1/2019 | Hedge | G06K 9/00228 |
| 2019/0073520 | A1* | 3/2019 | Ayyar | G06K 9/00248 |
| 2019/0073811 | A1* | 3/2019 | Shah | G06K 9/0061 |
| 2019/0325559 | A1* | 10/2019 | Hsu | G06T 7/13 |
| 2021/0192680 | A1* | 6/2021 | Masuda | G06N 20/00 |

* cited by examiner

AUTOMATICALLY MERGING PEOPLE AND OBJECTS FROM MULTIPLE DIGITAL IMAGES TO GENERATE A COMPOSITE DIGITAL IMAGE

BACKGROUND

Recent years have witnessed a significant increase in digital image editing. Indeed, advances in both hardware and software have increased the ability of individuals to capture, create, and edit digital images. For instance, the hardware on most modern computing devices (e.g., servers, desktops, laptops, tablets, and smartphones) enables digital image editing without significant lag time or processing delays. Similarly, improvements in software have enabled individuals to modify, combine, filter, or otherwise edit digital images. Examples of editing digital images include detecting an object, copying the object from one image into a new background, and removing an object from an image.

Notwithstanding these improvements in digital image editing, conventional systems have a number of problems in relation to flexibility and efficiency of operation in image editing systems, particularly with respect to combining or merging people and objects from multiple digital images into the same digital image. As an example, conventional systems are largely unable to automatically add missing persons to a digital image in a natural and realistic manner. To illustrate, while these conventional systems provide tools to assist users in editing digital images, they do not typically include the ability to automatically detect and merge missing people or objects across multiple digital images. Indeed, these conventional systems are rigidly restricted to a limited number of operations.

Additionally, conventional systems are inefficient. For example, conventional systems have significant shortfalls in relation to merging people and objects across images. For example, many conventional systems require a larger number of steps to add a missing person or object to a digital image. Further, many of these steps are inefficient as the rely on user input and user actions and require high precision user input in order to arrive at a good quality result. The high precision required can make it difficult or impossible to perform such operations using hand held devices (e.g., smart phones or tablets) due to the lack of screen space. As such, conventional systems often require merging people and objects to performed on traditional desktop computers with traditional input devices (e.g., a computer mouse). As many photographs are captured using handheld devices, conventional systems can require users to transfer images to other devices (e.g., a traditional desktop computer) in order to merge people and objects across images.

To better illustrate these inefficiencies, several conventional systems provide inefficient mouse input-based tools that further require users to manually perform numerous steps to add a missing person to an image. In some cases, these tools can be imprecise and difficult to use. In other cases, the tools are complex and require a high level of skill and expertise to operate. In both cases, conventional systems require the user to perform numerous manual steps to add a missing person to a digital image, which increases the number of operations needed to be performed by a computing device. Indeed, significant time and user interactions with different selection tools by the user waste substantial computing resources in detecting, displaying, selecting, merging, blending, and correcting missing persons in digital images.

In addition to the foregoing, conventional systems typically require switching between different user interfaces to merge people from different images. In particular, conventional systems typically require opening a first image in a first graphical user interface to select a person to move to a second image. Such systems then typically require opening a second user interface displaying the second image in order to add the selected person from the first image. More particularly, the process of merging people from different images can often require switching between user interfaces multiples times as part of the operation.

These, along with additional problems and issues exist in image editing systems with respect to automatically merging objects and people in digital images.

BRIEF SUMMARY

Implementations of the present disclosure provide benefits and/or solve one or more of the foregoing or other problems in the art with systems, non-transitory computer-readable media, and methods for automatically merging people and objects from multiple digital images into a composite group photo. For instance, the disclosed systems can utilize a number of models and operations to automatically analyze multiple digital images to identify a missing person from a base image, segment the missing person from the second image, and generate a composite group photo by merging the segmented image of the missing person into the base image. In this manner, the disclosed systems automatically create merged images that appear natural and realistic.

The following description sets forth additional features and advantages of one or more implementations of the disclosed systems, computer media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
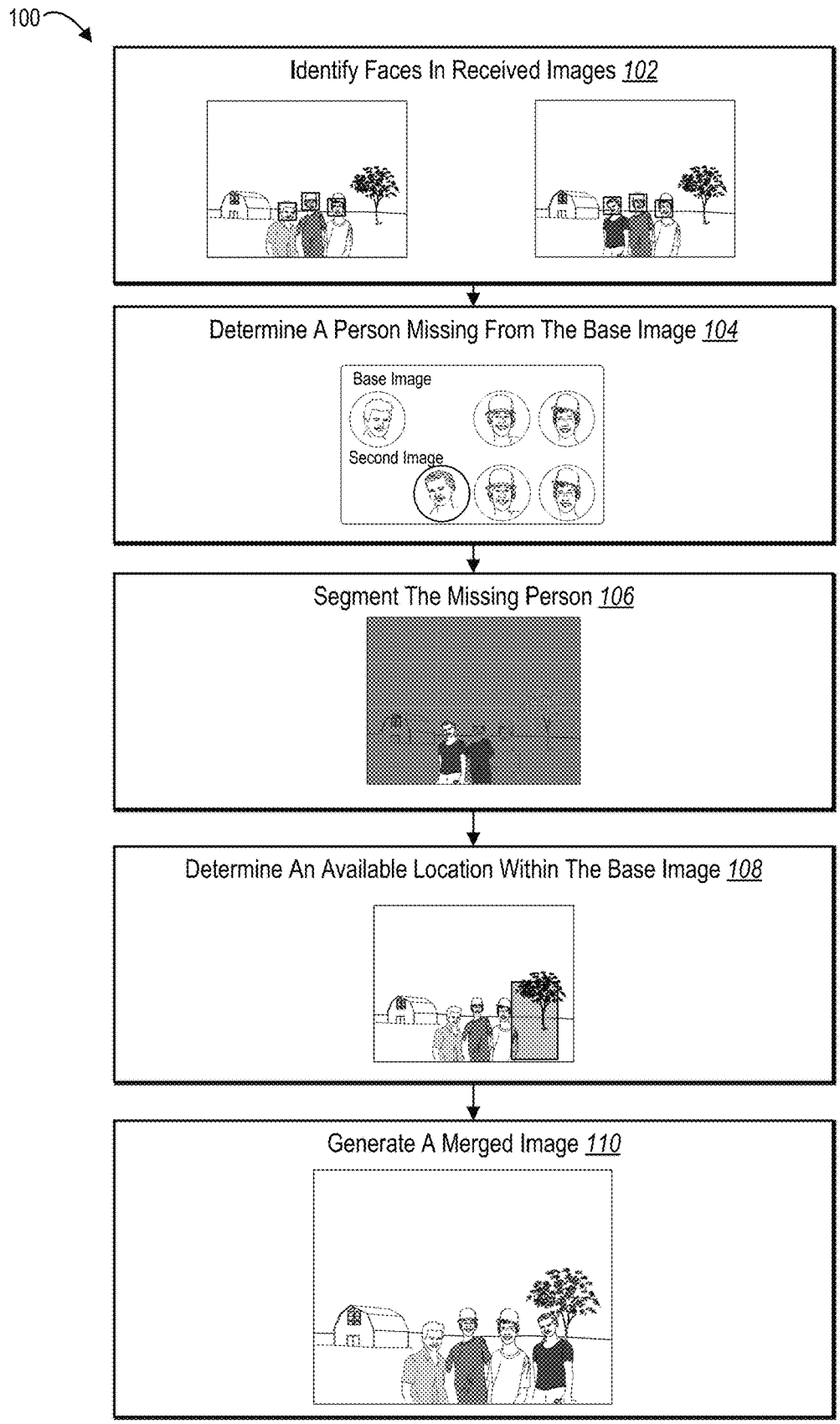
FIG. 1 illustrates an overview diagram of automatically merging people and objects from multiple digital images into a merged digital image in accordance with one or more implementations.

This disclosure describes one or more implementations of an image merging system that automatically and seamlessly generates a composite group photo by detecting and adding missing people to the group photo. In particular, in one or more implementations, the image merging system analyzes multiple digital images to detect one or more persons in the images that is missing from a first image (e.g., a base image). Additionally, the image merging system segments the missing person (e.g., from a second image). Then, the image merging system generates a composite group photo by adding and blending the segmented image of the missing person into the base image. The image merging system can also merge in missing objects, such as pets, into a composite group digital image.

To illustrate, in one or more implementations, the image merging system identifies multiple digital images (or simply "images"), where each of the images includes at least one person. The image merging system can then identify faces in the images and compare the faces between the images (e.g., a base image and a second image) to determine a person that is missing from the base image. Additionally, the media segment can generate a segmented image of the missing person from the second image utilizing a segmentation model. The image merging system can also determine an available location within the base image. Further, the image merging system can generate a merged image (e.g., a composite group photo) by merging and blending the segmented image of the missing person into the base image.

As mentioned above, the image merging system can identify faces of persons within a set of images (e.g., a base image and a second image). For instance, in one or more implementations, the image merging system utilizes a face detection model to detect faces within the images. In additional implementations, the face detection model can generate face descriptors for each detected face. In some implementations, the face detection model outputs a multi-dimensional vector for each detected face.

As also mentioned above, the image merging system can determine a person missing from the base image (a digital graphics file that when rendered displays one or more objects). For instance, in various implementations, the image merging system compares the face descriptors from faces in the base image with the face descriptors from faces in the second image. For example, the image merging system determines that a person is in both the base image and the second image based on their face descriptor from the second image matching (e.g., being within a face similarity threshold) their face descriptor in from the base image. In addition, the image merging system can determine that a person in the second image is missing from the base image based on the their face descriptor exceeding the face similarity threshold when compared with each of the face descriptors from the base image.

Based on identifying a missing person in the second image, the image merging system can create a segmented image of the missing person. For instance, in one or more implementations, the image merging system utilizes a segmentation model to generate the segmented image. For example, the segmentation model can create a bounding box around the missing person, generate an object mask of the missing person based on the bounding box, and generate a segmented image of the missing person based on the object mask (e.g., an indication of a plurality of pixels portraying an object such as a binary mask identifying pixels corresponding to an object).

As mentioned above, the image merging system can also determine an available or unoccupied location within the base image. Indeed, the image merging system can determine a location within the base image where the missing person would fit and appear naturally. In various implementations, the image merging system utilizes a systematic approach to determine the available location within the base image. For example, the image merging system analyzes people and objects (e.g., a visual representation of a subject, concept, or sub-concept in an image such as an object refers to a set of pixels in an image that combine to form a visual depiction of an item, article, partial item, component, or element) within the base image to determine the available location within the base image. In alternative implementations, the image merging system utilizes a locating identification model to determine an optimal available location within the base image.

Further, as mentioned above, the image merging system can generate a merged image (e.g., composite group photo) that includes all of the people found within the set of images. For example, in one or more implementations, the image merging system adds the segmented image of the missing person to the base image at the available location. In further implementations, the image merging system performs additional actions, such as blending and smoothing of the segmented images to ensure that the segmented image appears natural and realistic within the base image, as further described below.

As previously mentioned, the image merging system provides numerous advantages, benefits, and practical applications over conventional systems. To illustrate, unlike conventional image editing systems, the image merging system provides the flexibility to automatically merge people and objects from multiple digital images into a composite digital image, with minimal user interaction or effort. Further, the image merging system can operate utilizing a variety of models and algorithms. For example, the image merging system can perform a pipeline of actions where various actions can be flexibly interchanged with different models or sub-systems. Indeed, the image merging system provides increased flexibility and expanded functionality over conventional systems.

As a further example, the image merging system provides increased accuracy over conventional systems. For instance, the image merging system creates natural and realistic composite group photos that do not require user input to correct, touch up, or further modify. Additionally, the image merging system can automatically generate these merged image within a few seconds or even less time. In contrast, using conventional systems, users would need to manually manipulate portions of each image, which could take multiple hours to generate a comparable composite group photo.

Moreover, the image merging system significantly reduces the number of actions that many conventional systems require of users to generate a merged group image from multiple images. Rather than manually using inefficient mouse input-based tools to select, segment, paste, and blend a missing person, the image merging system intelligently performs each of these actions automatically. Indeed, the image merging system greatly simplifies the process to where the user, at most, provides images as input.

In addition to the foregoing, image merging system improves the efficiency of computing devices by reducing or eliminating the need to navigate between multiple user interfaces as required by conventional system in order to be able to merge people or objects across images. In particular, the image merging system allows a user to select two images in a single user interface. Based on user input received in a single user interface, the image merging system can generate a merged image by inserting a missing person from a first image into an available location in a second image. Furthermore, by eliminating the need to preciously select the missing person and perform other tedious steps, the image merging system can allow handheld devices (e.g., smart phones and tablets) with limited screen space to merge people and objects across images.

Referring now to the figures, FIG. 1 illustrates a diagram of a process of creating a merged group photo performed by the image merging system. In particular, FIG. 1 includes a series of acts 100 of the image merging system automatically merging people and objects from multiple digital images into a merged image (e.g., composite group photo) in accordance with one or more implementations disclosed herein. To illustrate, in one or more implementations, the image merging system operates on a client device associated with a user. In other implementations, the image merging system utilizes a server device to perform one or more of the actions described in connection the series of acts 100.

As shown in FIG. 1, the series of acts 100 includes an act 102 of the image merging system identifying faces in received images. For example, the image merging system receives a base image and a second image, where at least one person in the second image is not pictured in the base image. To illustrate, the base image (i.e., the left image) shown in connection with the act 102 includes three men, while the second image (e.g., the right image) includes a women and two men.

Further, in some implementations, the act 102 can include the image merging system identifying faces of each of the people in the received images. For instance, the image merging system utilizes a face detection model to detect faces in both of the images. In some implementations, as described below, the image merging system can generate face descriptors for each of the faces in the two images. Additional details regarding identifying faces within the images is provided below in connection with FIGS. 2 and 3A-3B.

As shown, the series of acts 100 includes an act 104 of the image merging system determining a person missing from the base image. For example, in one or more implementations, the image merging system determines if the second image includes one or more faces (i.e., people) that are not included (i.e., missing) in the base image. Additionally, or in the alternative, the image merging system can also determine which faces match across the base image and the second image. To illustrate, the image shown in connection with the act 104 includes a chart showing matching faces between the base image and the second image. Additional details regarding determining a face missing from the base image is provided below in connection with FIGS. 4 and 5.

As shown, the series of acts 100 includes an act 106 of the image merging system segmenting the missing person. For instance, in various implementations, the image merging system isolates the missing person in the second image and generates a segmented image of the missing person. For example, the image merging system utilizes a segmentation model to detect the missing person, create an object mask isolating the missing person, and generating the segmented image, as further described below. To illustrate, the image shown in connection with the act 106 includes an object mask isolating the missing person. Additional details regarding segmenting the missing person is provided below in connection with FIGS. 6 and 7A-7C.

As shown, the series of acts 100 includes an act 108 of the image merging system determining an available location within the base image. For instance, in one or more implementations, the image merging system determines an available location based on the location of objects and people within the base image. In some implementations, the image merging system utilizes one or more models to determine the available location within the base image. To illustrate, the image shown in connection with the act 108 includes a shaded box indicating the selected available location. Additional details regarding determining an available location in the base image is provided below in connection with FIGS. 8 and 9A-9B.

In addition, as shown, the series of acts 100 includes an act 110 of the image merging system generating a merged image. For example, in various implementations, the image merging system generates a composite group photo that merges the missing person from the second image into the base image utilizing the base image, the available location, and the segmented image of the missing person. To illustrate, the image shown in connection with the act 110 includes a composite group photo with all of the people found in both the baes image and the second image. Additional details regarding generating a merged image is provided below in connection with FIGS. 10 and 11.

Figure 2:
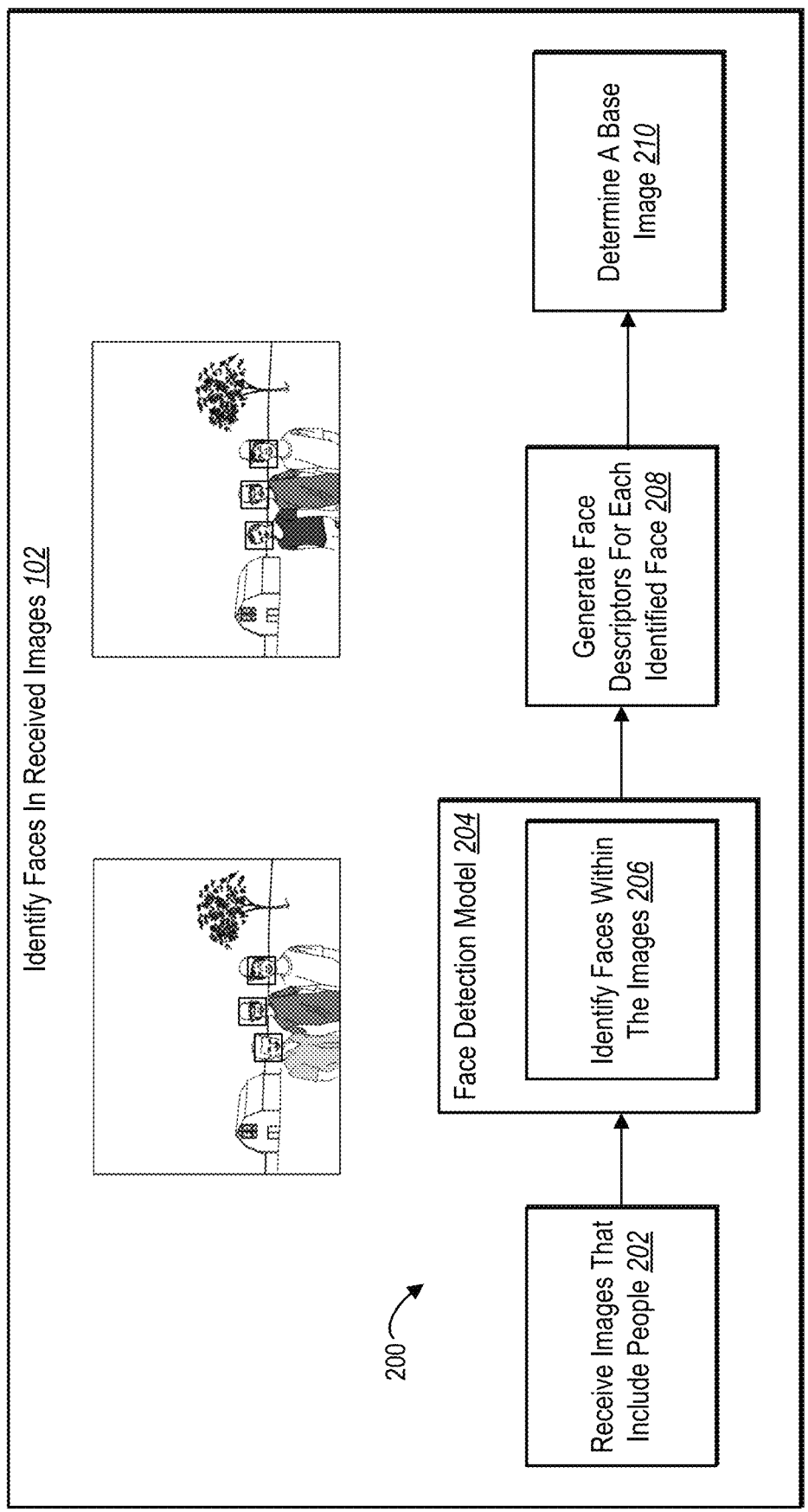
FIG. 2 illustrates a flow diagram of detecting faces within digital images in accordance with one or more implementations.
Figure 3A:
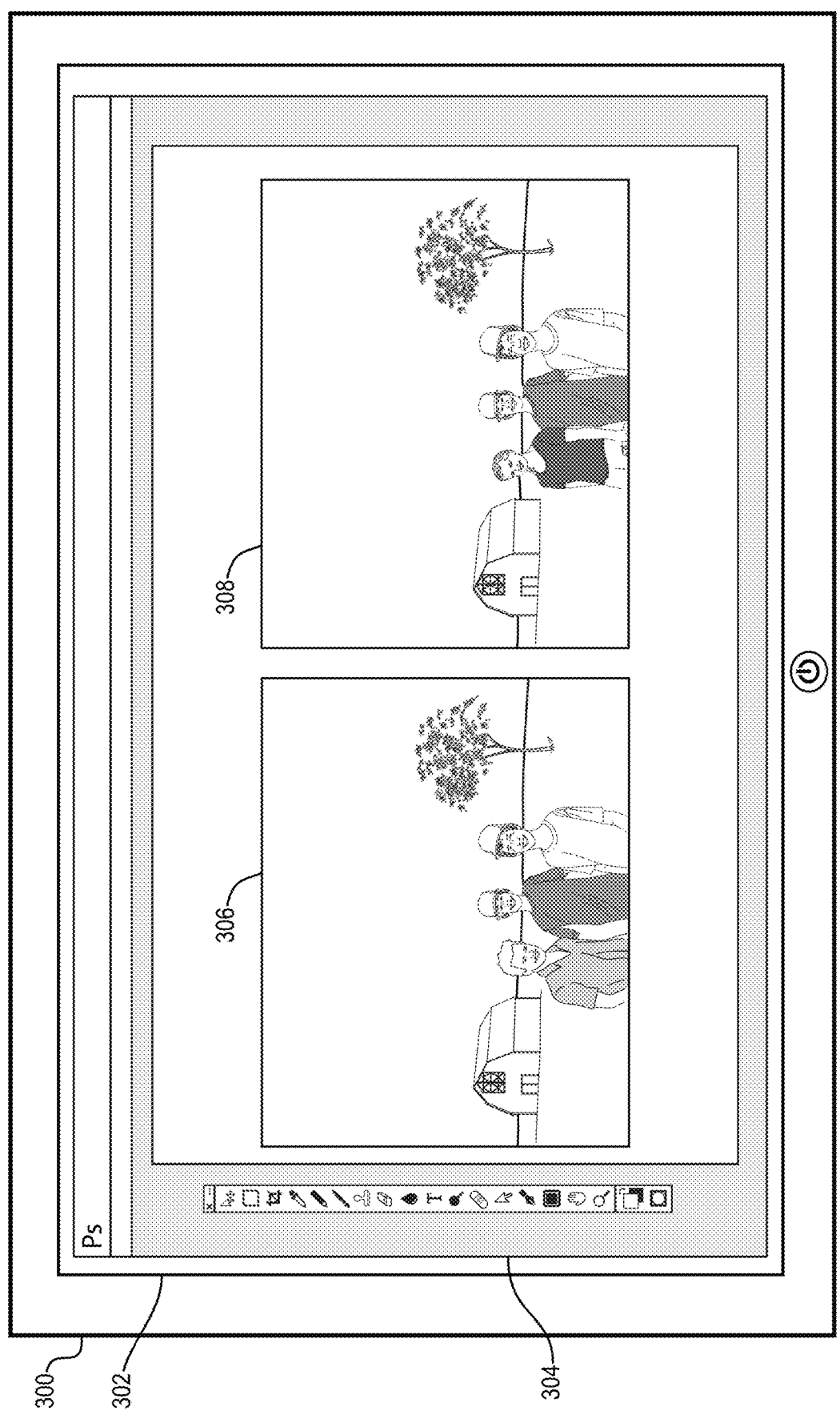
FIGS. 3A-3B illustrate graphical user interfaces showing digital images and detected faces within the digital images in accordance with one or more implementations.
Figure 3B:
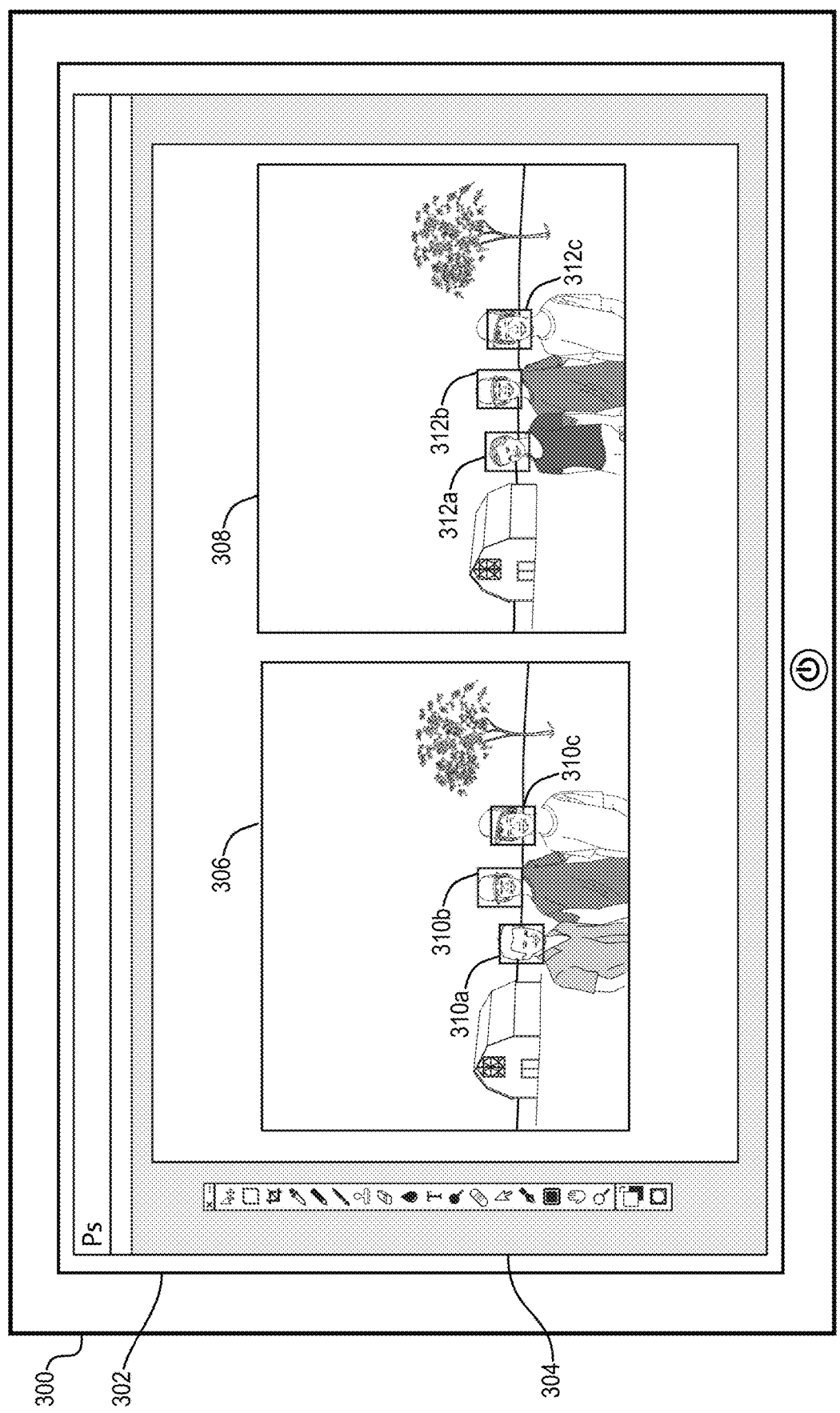

As mentioned above, FIGS. 2 and 3A-3B illustrate the image merging system identifying faces within a set of images. To illustrate, FIG. 2 illustrates a flow diagram of detecting faces within digital images in accordance with one or more implementations. FIGS. 3A-3B illustrate graphical user interfaces of detecting faces within digital images in accordance with one or more implementations.

As shown in FIG. 2, the series of acts 200 includes the act 202 of the image merging system receiving images. For example, the image merging system receives a set of images that includes a first image of one or more persons and a second image of one or more persons including at least one person not in the first image. In some implementations, the set of images includes additional images (e.g., a third image that also includes a person not pictured in the first image).

In one or more implementations, a user provides the set of images to the image merging system. For example, the image merging system provides a graphical user interface to the user that enables them to select, upload, download, share, or otherwise provide access to the set of images. For instance, the image merging system is located on a client device that has image capturing hardware (i.e., a camera), which captures the set of images.

In some implementations, the image merging system automatically detects the set of images with little or no user intervention. For example, the image merging system communicates with a camera or a client device having a camera and detects when multiple images are being captured (e.g., at images are captured at the same location and/or within a time threshold), which triggers creation of a composite group photo. As another example, a client device can include a "group photo" setting that, when activated, provides the set of images to the image merging system.

As shown in the series of acts 200, the image merging system can utilize a face detection model 204 to identify faces within the images. To illustrate, the series of acts 200 includes an act 206 of the image merging system utilizing the face detection model 204 to identify faces within the images. For instance, the face detection model 204 is a face detection neural network trained to identify and isolate faces of persons within each of the images. For example, the face detection neural network generates bounding boxes around each of the detected faces in the images.

More particularly, the image merging system can train a face detection neural network to detect faces in images based on supervisory training utilizing a data training set that includes training images of people and a corresponding ground truth (where faces are located within the training images). In particular, the image merging system can focus on identifying faces of people in a group setting. In alternative implementations, the image merging system can utilize a pre-trained face detection neural network. In additional implementations, the image merging system can utilize a general object classification neural network that detects people and faces among other object classes.

As mentioned above, the image merging system can include the face detection model 204. In various implementations, the face detection model 204 is a machine-learning model. For context, a machine-learning model can include a computer representation that can be tuned (e.g., trained) based on inputs to approximate unknown functions. In particular, a machine-learning model can include a model that utilizes algorithms to learn from, and make predictions on, known data by analyzing the known data to learn to generate outputs that reflect patterns and attributes of the known data.

In additional implementations, the face detection model 204 is a neural network. Often, a neural network refers to a machine learning model that includes interconnected artificial neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), recurrent neural network (RNN), graph neural network, generative adversarial neural network (GAN), and single-shot detect (SSD) network.

In some implementations, the face detection model 204 identifies faces in the images based on identifying one or more facial features or landmarks of a user's face. For example, the image merging system can identify a person's face based on identifying visual element related to a user's face or head, such as a user's eyes, nose, mouth, hair, forehead, eyebrows, ears, hat, or glasses. In alternative implementations, the image merging system detects faces in one or more images based on user input (e.g., the user selects one or more faces within one or more of the images). In one or more implementations, the face detection model 204 comprises a cascaded convolutional neural networks such as those described in U.S. Pat. No. 9,418,319, assigned to Adobe Inc., and hereby incorporated by reference in its entirety. In other implementations, the face detection model 204 comprises a face detection algorithm such as those described in U.S. Pat. No. 9,940,544, assigned to Adobe Inc., and hereby incorporated by reference in its entirety.

As shown, the series of acts 200 includes an act 208 of the image merging system generating a face descriptor for each identified face. In one or more implementations, the image merging system and/or a face detection model 204 generates a facial feature vector for each face descriptor. For example, the image merging system can take as input a portion of an image comprising a face identified by the face detection model 204 (e.g., a patch of an image comprising a bounding box or other approximate boundary including an identified face). The image merging system can generate a facial feature vector for the identified face utilizing a neural network. For example, the image merging system can extract features from the image portion utilizing one or more layers of a neural network. Thus, the facial feature vector can comprise latent or hidden values. In these implementations, while these face feature values that are generated by the image merging system are not recognizable to a user, they nonetheless characterize the facial features. More specifically, each facial descriptor can comprise a multi-dimensional feature vector comprising a large number of face feature values. The face feature values can be latent or can be custom features that the neural network is trained to identify, such as, facial height, width, shape, hair/no hair, and skin tone, as well as the location of a user's facial features (e.g., eyes, noise, and mouth) relative to the entire face, hair length, facial feature angles (e.g., chin angle), facial feature lengths (e.g., mouth, nose, eyes), distances between facial features (e.g., distance between eyes), facial feature curvatures/shapes, or pixel intensities.

In one or more implementations, the image merging system can use the neural network of the face detection model 204 to generate the face descriptors. In alternative implementations, the image merging system can use a different neural network or another machine learning model. As a non-limiting example, the image merging system can generate the face descriptors utilizing a convolutional neural network as described in U.S. Pat. No. 9,940,544, assigned to Adobe Inc., and hereby incorporated by reference in its entirety. In still further implementations, the image merging system can generate face descriptors using the techniques described in U.S. Pat. No. 10,043,101 in relation to generating final image feature vectors, including combining Gaussian mixture components. U.S. Pat. No. 10,043,101 is assigned to Adobe Inc. and hereby incorporated by reference in its entirety.

As shown, the series of acts 200 can include an act 210 of the image merging system determining a base image. In one or more implementations, the image merging system determines the base image from the received image based on user input. For example, the user selects the base image or otherwise indicates one of the images in the set of images as the base image. As another example, the image merging system selects the first image (or last image) in the set of images as the received image.

In some implementations, the image merging system analyzes the images to determine the base image. For example, the image merging system selects the image in the set of images that includes the most people as the base image. In various implementations, the image merging system generates a facial score (e.g., a photogenic score) for each face based on one or more factors (e.g., whether a user has their eyes open, are smiling, are looking at the camera). Based on the facial scores of the images, the image merging system selects the base image (e.g., the image merging system selects the image with the highest facial scores averaged across users detected in the image). In one or more implementations, the image merging system selects the base image based on image quality and clarity (e.g., focus, sharpness, lighting). In other words, the image merging system can select an image with the highest rating as a base image. In one or more implementations, the image merging system can generating ratings for the images using the techniques described in U.S. Patent Application Publication No. 2019/0147305, assigned to Adobe Inc., and hereby incorporated by reference in its entirety.

In various implementations, the image merging system validates the images in the set of images before proceeding to generate a composite group photo (i.e., merged image) that merges missing persons across images. Indeed, the image merging system can utilize one or more safeguards to prevent a user from requesting any person, such as celebrities, to their group photos. For example, the image merging system can validate the set of images based on timestamp, such as determining that the images in the set of images are captured within a threshold period of time (e.g., 5 minutes, 1 hours, 1 day). As another example, the image merging system validates based on location, such as determining that images have geotags within a threshold distance of each other (e.g., 10 feet, 50 feet, 1 mile). As yet another example, the image merging system validates based on capture device, such as determining that the device identifier of the capturing device (e.g., camera or smartphone) matches for each of the images.

In some implementations, the image merging system analyzes the images in the set to determine if a threshold number of people or objects match across the images. For example, if at least one face matches across the base image and the second image, the image merging system can validate the second image. As another example, if two of more objects match in both images, then the image merging system validates the second image. In one or more implementations, the image merging system validates the image based on matching the colors, lighting, metadata, or other properties between the images in the set of image before validating the set of images.

Additionally, in some implementations, the image merging system validates the images based on facial recognition. For example, if the image merging system detects that the missing person matches another person in the camera roll of the user's client device and/or the missing person appears at least a threshold number of times within previous pictures captured by the user, the image merging system can validate an image.

In various implementations, the image merging system can allow a user to manually validate the images. For example, if a family has a child at college and the child does not appear in a family photo, the image merging system can add a picture of the child (e.g., the second image) to the family photo (e.g., the base image). As mentioned above, the image merging system may fail to validate the two images due to one or more validation tests failing (e.g., the images were captured at different times, at different locations, and/or with different devices). In these cases, however, the image merging system can allow a user to override the invalidation result and proceed to merge the child to the family photo.

While, as described above, the base image and the second image each include at least one person, in one or more implementations, the base image does not include any people (or at least no faces are detectable within the first image). For example, a user hiking by herself takes a picture of a mountain landscape and later captures an image of herself. Here, the image merging system can assist the user in adding her picture to the mountain landscape using the actions and techniques described herein.

FIGS. 3A-3B show a corresponding graphical user interface that includes the image merging system detecting faces of users within a set of images. As shown, FIGS. 3A-3B include a client device 300 displaying a graphical user interface 302 (or simply "interface 302"). The interface 302 includes an image editing application 304 that provides various image editing tools and options. In addition, the image editing application 304 includes a base image 306 and a second image 308.

In one or more implementations, the image merging system provides another graphical user interface to the user. For example, the graphical user interface is not located within an image editing application, but is part of a standalone application. In some implementations, the graphical user interface is a simplified selection option within another application, such as a photos or camera application. In still other implementations, the image merging system does not provide any graphical user interface to a user, but automatically detects a set of images, as described above.

As mentioned above, FIG. 3A includes the base image 306 and the second image 308. As shown, the base image 306 includes three men posing for a picture in front of a barn and a tree. Similarly, the second image 308 includes a woman and two men posing in front of the same barn and tree. Notably, the men with hats on the right are in both the base image 306 and the second image 308 while the man on the left in the base image 306 is not in the second image 308 and the woman on the left in the second image 308 is not in the base image 306.

In FIG. 3B, the image merging system detects faces in the base image 306 and the second image 308 (e.g., via a face detection model), as described above. As shown, the image merging system detects a first set of faces 310*a*, 310*b*, 310*c* within the base image 306 and a second set of faces 312*a*, 312*b*, 312*c* within the second image 308. As described above, the image merging system can generate bounding boxes around the sets of detected faces. While FIG. 3B illustrates the image merging system generating bounding boxes around the sets of detected faces in the base image 306 and the second image 308, in many implementations, the image merging system detects faces within the images without displaying this action to a user. Indeed, the image merging system performs the actions of detecting faces of users in the images as a background process that is transparent to a user.

In one or more implementations, the image merging system can generate face descriptors for each of the identified faces. For example, the image merging system analyzes the facial features of each detected face and generates a face descriptor based on the result of the analysis. For instance, as described above, the face descriptor for a detected face includes facial feature values from one or more facial features of the face.

Figure 4:
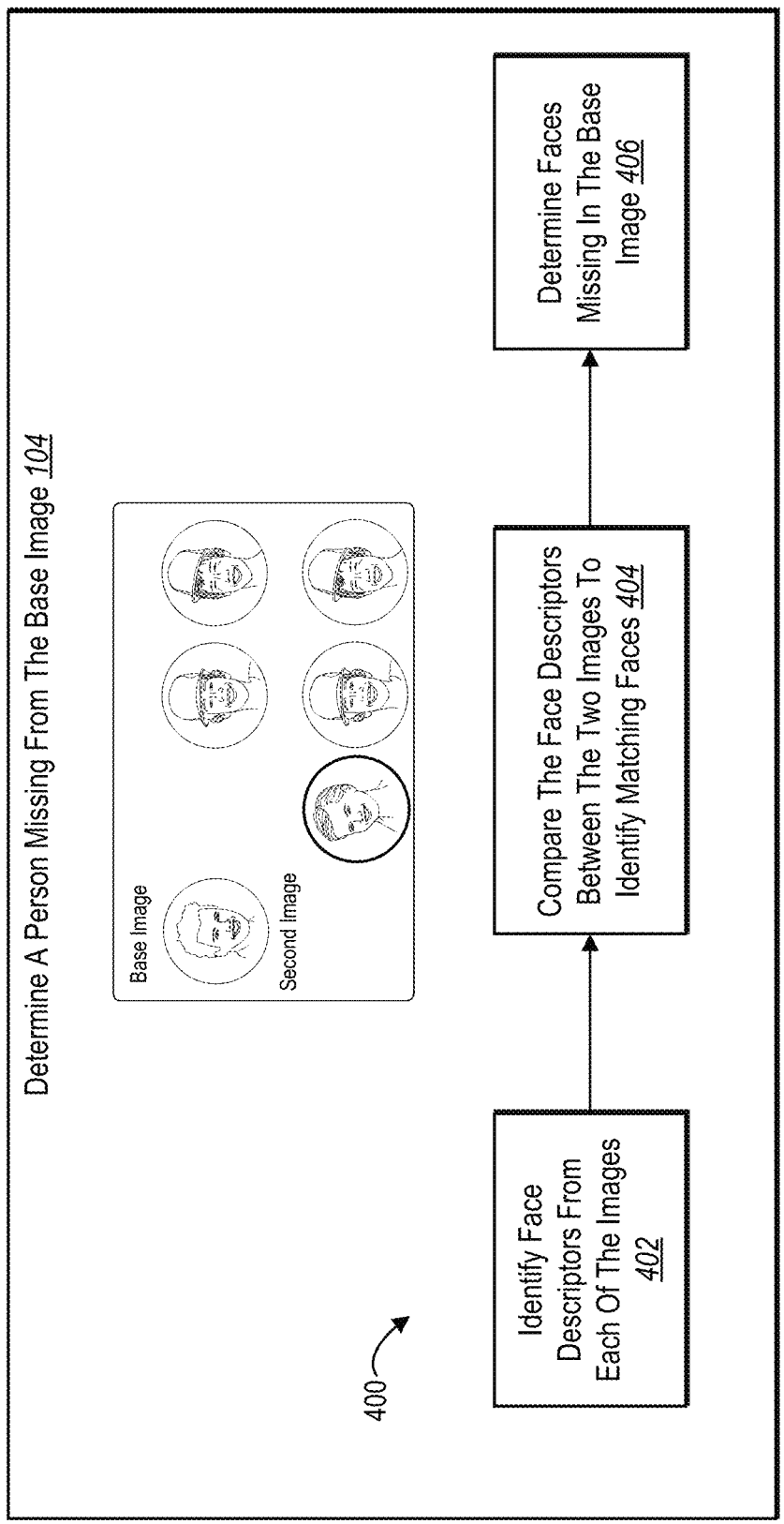
FIG. 4 illustrates a flow diagram of determining a person missing from a base image in accordance with one or more implementations.
Figure 5:
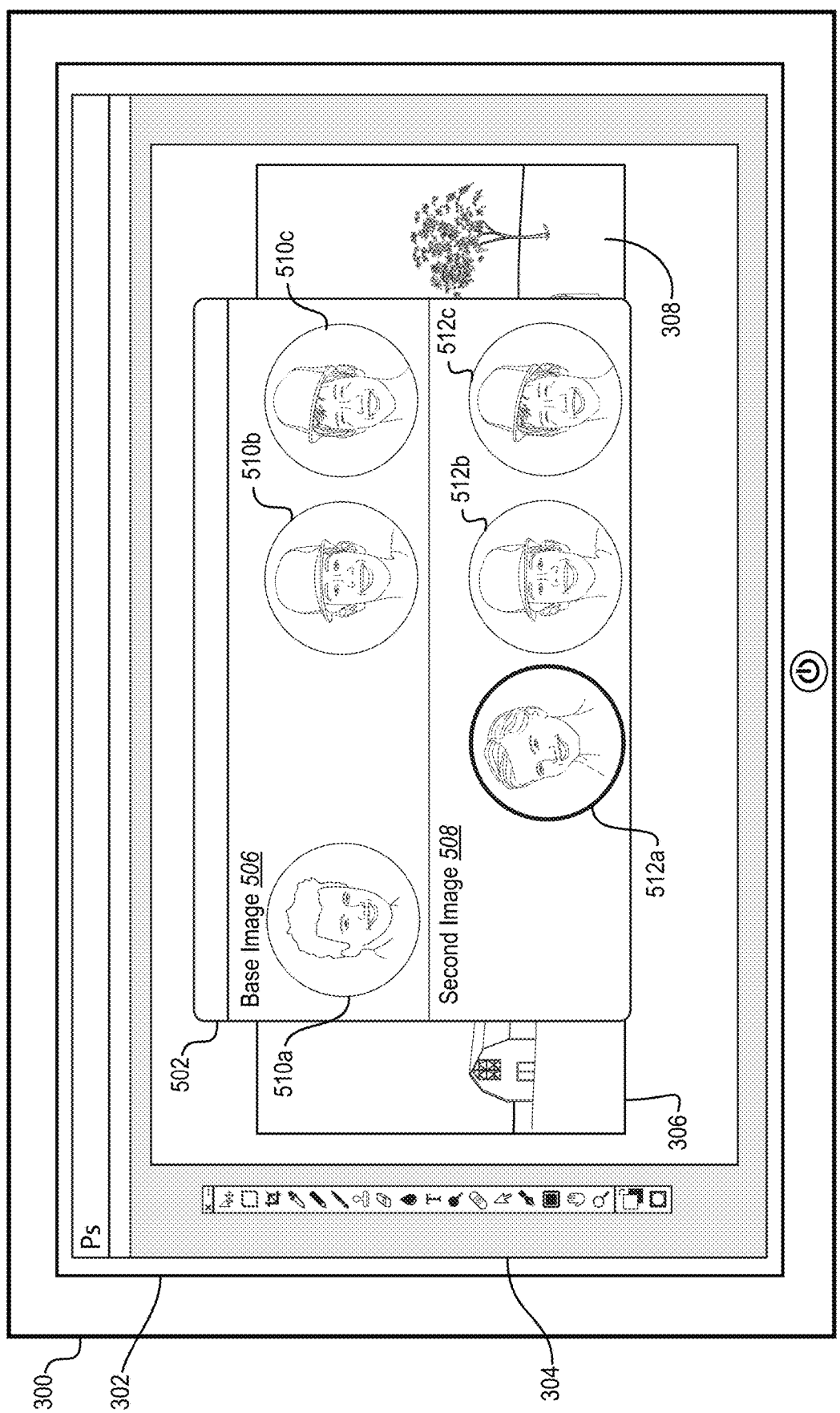
FIG. 5 illustrates a graphical user interface indicating a person missing from the base image in accordance with one or more implementations.

As mentioned above, FIGS. 4 and 5 provides additional details regarding determining a face missing from the base image. In particular, FIG. 4 provides a flow diagram of the image merging system determining a person missing from the base image. FIG. 5 shows a corresponding graphical user interface of indication a determination of one or more faces missing from the base image.

As shown, FIG. 4 includes a series of acts 400 of the image merging system determining faces missing in the base image in accordance with one or more implementations. As illustrated, the series of acts 400 includes an act 402 of the image merging system identifying face descriptor for each face from each of the images. For example, the image merging system utilizes the face descriptors identified above. For instance, the face descriptors can include a multi-dimensional feature vector.

In addition, the series of acts 400 includes an act 404 of the image merging system comparing the face descriptors between the two images to identify matching faces. For example, in one or more implementations, the image merging system compares each of the face descriptors for faces detected in the base image to each of the face descriptors for faces detected in the second image. Based on comparing the face descriptors, the image merging system determines whether one or more faces in the base image match one or more faces in the second image.

In one or more implementations, the image merging system determines a matching face across the base image and the second image when a face descriptor in the base image, when compared to a face descriptor in the second image, has a similarity score that is within a face similarity threshold. For example, the image merging system can compare two face descriptors by determining a distance between face descriptors in a multi-dimensional space. In particular, the image merging system can determine that that two face descriptors match when their Euclidian norm distance (e.g., L2 distance) is within the similarity threshold of one or less (i.e., ≤1) or another similarity threshold value. In various implementations, the similarity threshold corresponds to tolerances set when training the face detection model that generates the face descriptors. Indeed, the similarity threshold can correspond to the face descriptors generated by the face detection model.

In additional implementations, the image merging system can group matching faces across the two (or more) images by person. For example, the image merging system assigns faces within the similarity threshold (e.g., matching faces) to their own group. In these implementations, faces in the second image that are not assigned to a group can correspond to a person missing from the base image. Further, in some implementations, the image merging system prevents more than one person from an image from being assigned to the same group. For example, if two faces in the second image are each within the similarity threshold of a face in the base image, the image merging system assigns the face in the second image having the higher similarity score (e.g., shorter L2 similarity distance) with the face in the base image to a group.

In various implementations, the image merging system utilizes clustering techniques to determine matching faces across images. For instance, the image merging system generates a cluster map of faces based on a face descriptor corresponding to each face. The cluster map can be two-dimensional or n-dimensional, where n corresponds to the number of face feature values in a face feature vector of a face descriptors (or less than all the values). Often, the cluster map will show distinct groups of matching faces for people who are in both images. Otherwise, the cluster map will show isolated faces without a corresponding match.

In one or more implementations, rather than determining matching faces between the base image and the second image, the image merging system determines whether a face in the second image does not have a match with a face in the base image. For example, for each face detected in the second image, the image merging system determines if any face descriptors in the base image are within the similarity threshold. If not, then the face in the second image corresponds to a missing person. Otherwise, the face in the second image matches a face in the base image.

As shown in FIG. 4, the series of acts 400 can include an act 406 of the image merging system determining faces missing in the base image. For example, the image merging system determines that the second image includes one or more faces without a corresponding match in the base image, as described above. In some implementations, the image merging system determines that the second image includes multiple faces that do not match a face in the base image. Further, in various implementations, the image merging system determines that the base image includes one or more faces not included (i.e., missing) in the second image.

In additional implementations, the image merging system can go beyond matching faces across a base image and a second image. For example, in one or more implementations, for each group of matching faces (e.g., faces of the same person), the image merging system can analyze the faces and generate one or more ratings. Utilizing the ratings, the image merging system can determine which face is more photogenic. For example, the image merging system can train and utilize a neural network to generate a rating for each face (e.g., based on faces that are relaxed, smiling, looking toward to camera, or other characteristics). The image merging system can tag the "better looking" face in each match for future use. In one or more implementations, the image merging system can generating ratings for the faces using the techniques described in U.S. Patent Application Publication No. 2019/0147305, assigned to Adobe Inc., and hereby incorporated by reference in its entirety.

In some implementations, the image merging system can determine relationships between people in one or more of the images. For example, the image merging system can utilize a table that links faces to relationships (e.g., friend, partner, spouse, sibling, parent, co-worker, neighbor). Additionally, or in the alternative, the image merging system communicates with a social networking system associated with the user to identify relationships (e.g., based on matching faces on the social networking site with those detected in the images).

In one or more implementations, the image merging system trains a machine-learning model to determine relationships based on poses of people within the images. For example, if a non-missing person is holding the missing person, the image merging system can determine that the missing person has a physical connection with the non-missing person (e.g., the two people form some type of couple). As described below, the image merging system can utilize the physical connection to determine where to place the missing person in the base image and/or whether to move the "couple" together from the second image to the base image.

To illustrate, FIG. 5 shows the image merging system updating the graphical user interface 302 to display a face matching table 502 within the image editing application 304 of the client device 300. As shown, the face matching table 502 includes a base image row 506 of faces 510a, 510b, 510c identified in the base image 306 and a second image row 508 of faces 512a, 512b, 512c identified in the second image 308.

Additionally, the columns of the face matching table 502 are arranged to show matched faces across the two images by column (e.g., each column corresponds to the same person). For example, the last two faces (i.e., 510b, 510c) in the base image row 506 match the last two faces (i.e., 512b, 512c) in the second image row 508. In contrast, the image merging system did not find face matches for the first face 510a in the base image row 506 and the first face 512a in the second image row 508.

As indicated by the bold outline, the image merging system identifies the first face 512a in the second image row 508 as missing from the base image 306. Indeed, upon matching faces across the base image 306 and the second image 308 based on facial descriptors, the image merging system determines that the first face 512a does not match any of the facial descriptors from the base image 306, as previously described. Accordingly, the image merging system determines that the first face 512a in the second image row 308 as the missing face. While FIG. 5 illustrates the image merging system generating a graphical user interface grouping the faces and identifying a missing face, in many implementations, the image merging system groups faces and/or identifies missing faces within the images without displaying these actions to a user. Indeed, the image merging system performs the grouping and identifying missing faces as a background process that is transparent to a user.

Figure 6:
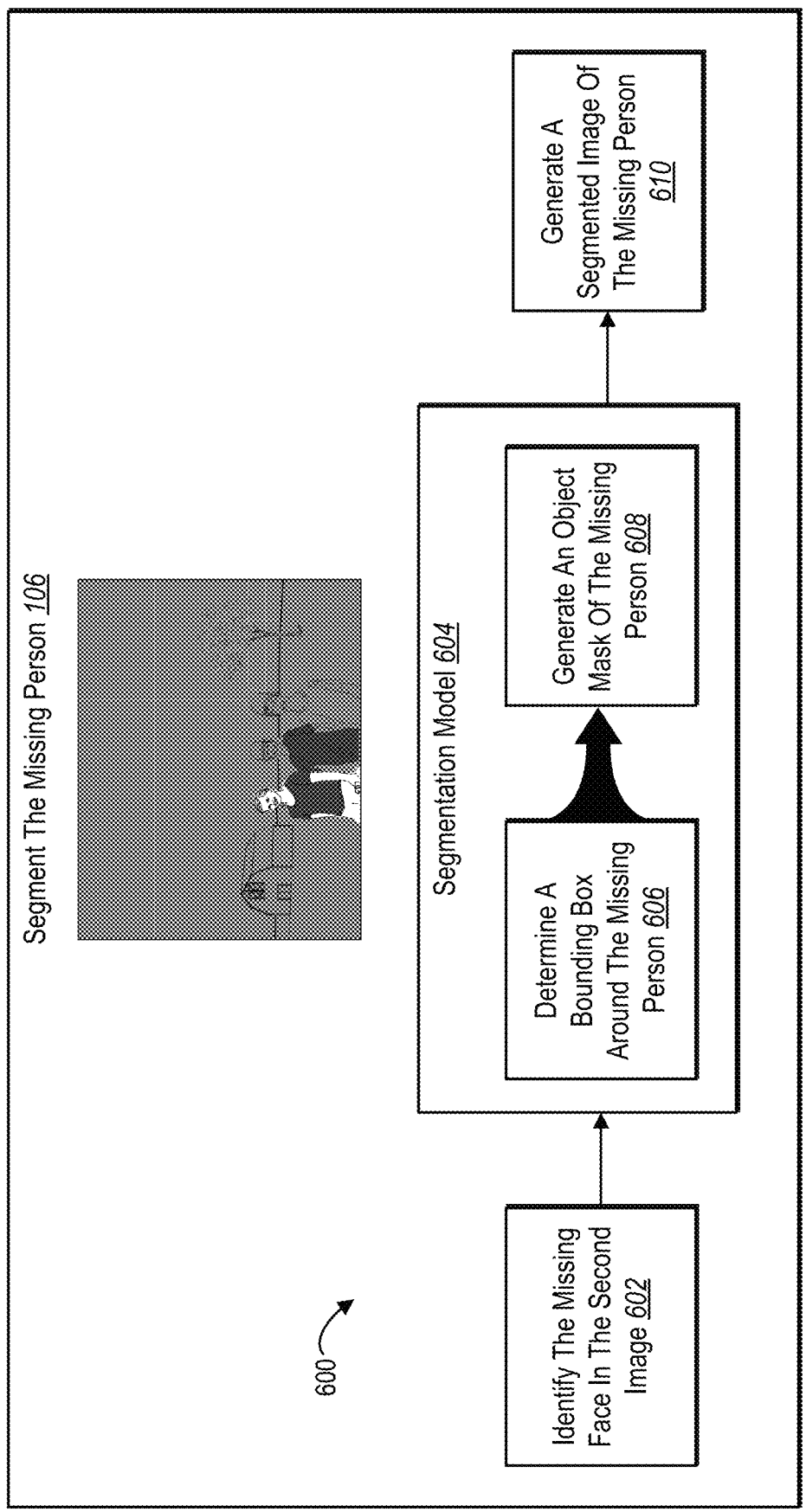
FIG. 6 illustrates a flow diagram of generating a segmented image of the missing person in accordance with one or more implementations.
Figure 7A:
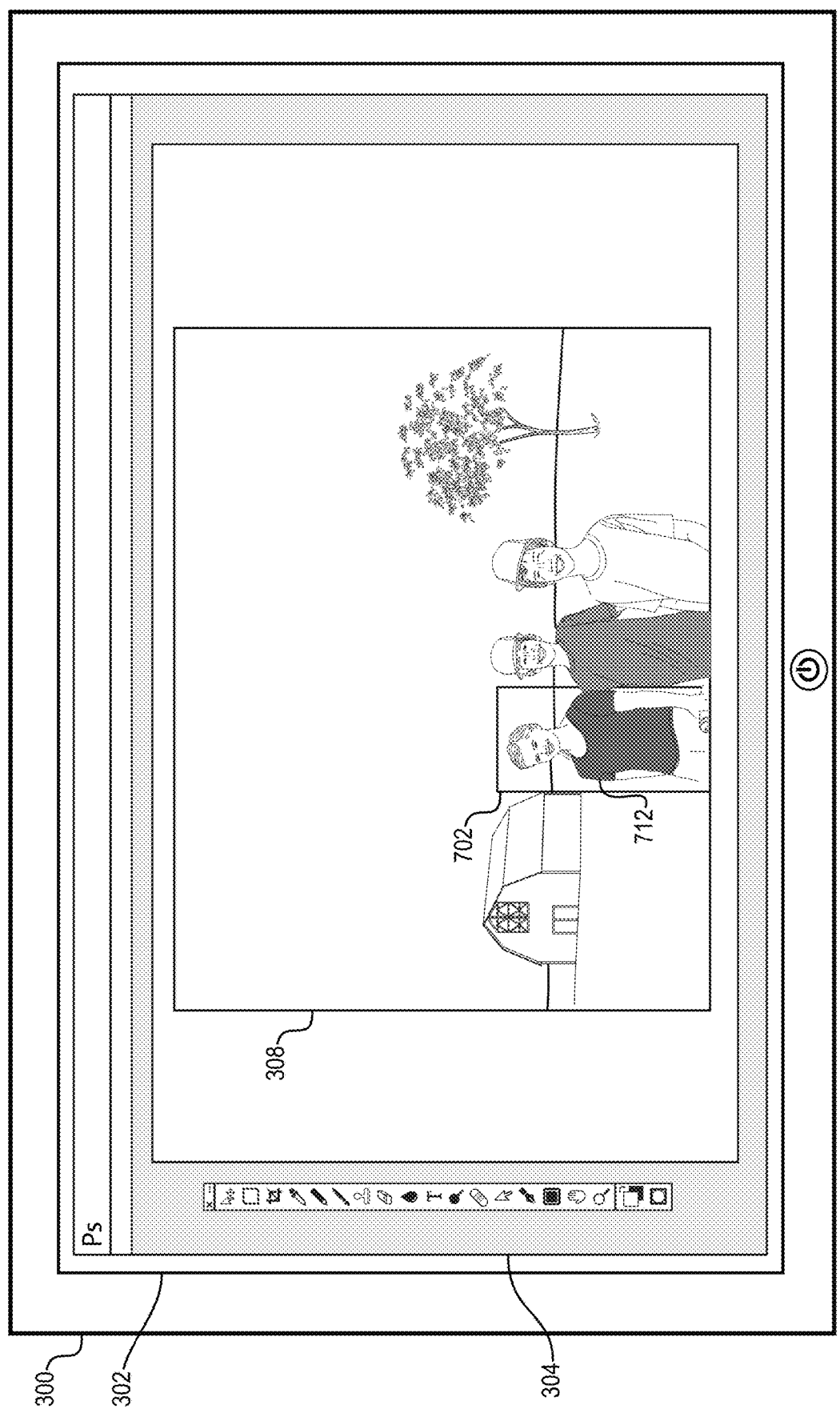
FIGS. 7A-7C illustrate a sequence of graphical user interfaces provided as part of generating a segmented image of a missing person in accordance with one or more implementations.
Figure 7B:
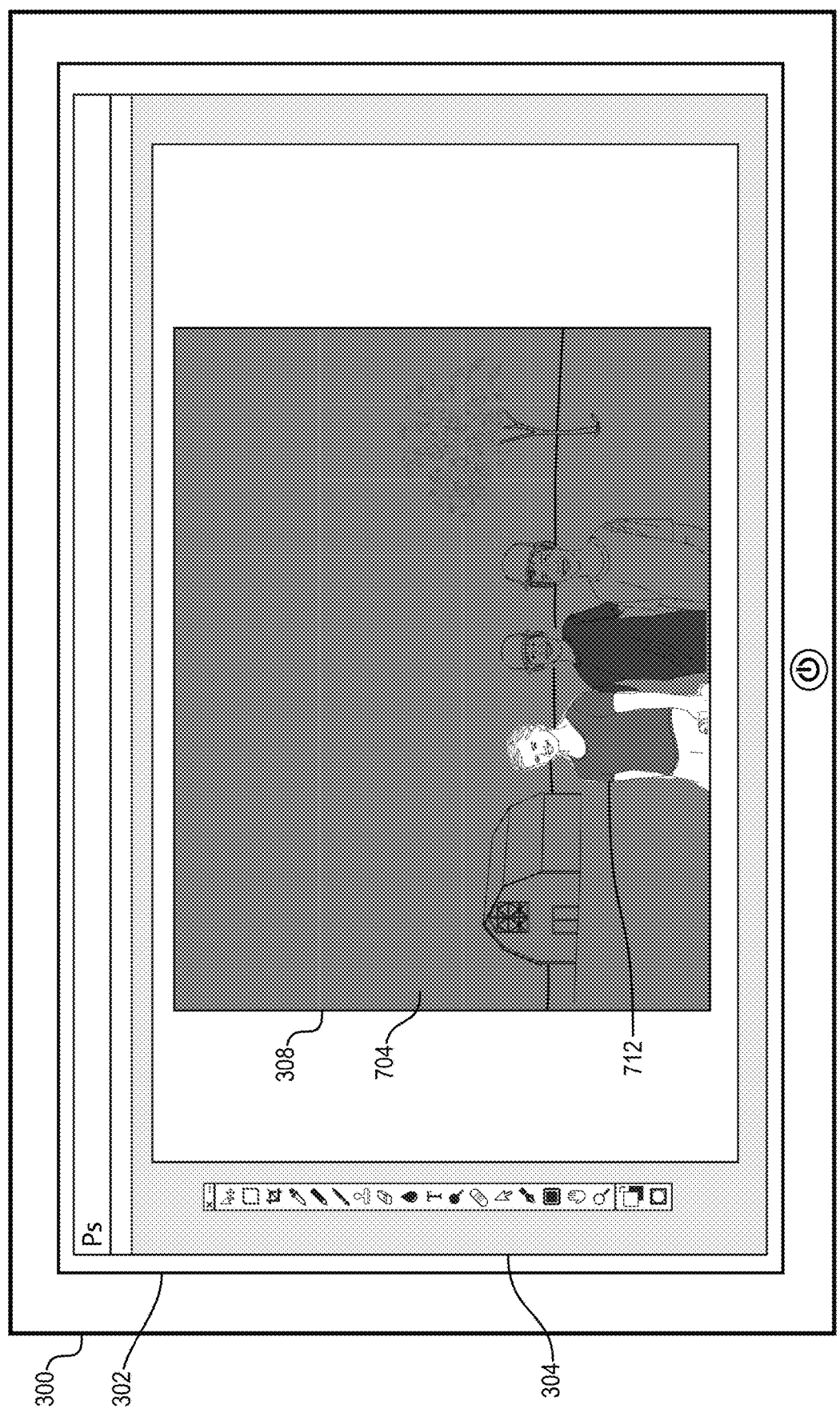
Figure 7C:
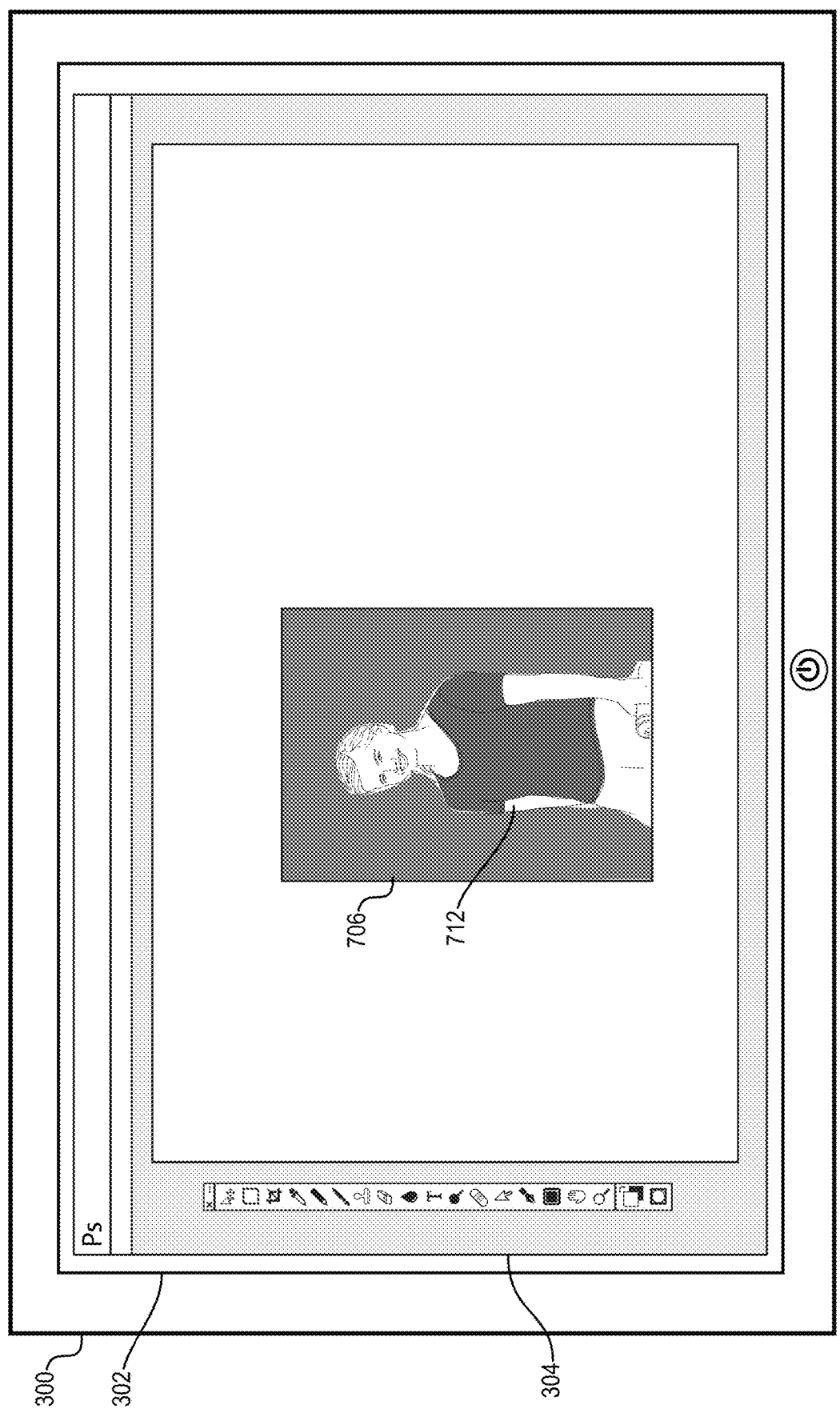

As mentioned above, FIGS. 6 and 7A-7C provides additional details regarding segmenting the missing person. In particular, FIG. 6 provides a flow diagram of generating a segmented image of the missing person. FIGS. 7A-7C shows corresponding graphical user interfaces illustrating the process of generating the segmented image of the missing person.

As shown, FIG. 6 includes a series of acts 600 of the image merging system generating a segmented image of the missing person in accordance with one or more implementations. As illustrated, the series of acts 600 includes an act 602 of the image merging system identifying the missing person in the second image. For example, the image merging system utilizes one or more of the actions or techniques described above in connection with FIG. 3A to identify the missing face in the second image.

In addition, as shown, the image merging system can utilize a segmentation model 604 as part of generating a segmented image of the missing person. In some implementations, the segmentation model 604 is an object mask neural network that can generate an object mask of the missing person. In various implementations, the image merging system trains the segmentation model 604 to generate segmented images. In alternative implementations, the image merging system obtains a pre-trained segmentation model 604.

To illustrate, the series of acts 600 includes an act 606 of the image merging system utilizing the segmentation model 604 to generate a bounding box around the missing person. For example, in one or more implementations, the image merging system provides the location of the missing face in the second image to the segmentation model 604, which then detects the full body of the missing person. For instance, the segmentation model 604 detects and generates a bounding box (e.g., an approximate boundary) around a body that also encompasses the missing face.

As shown, the series of acts 600 includes an act 608 of the image merging system utilizing the segmentation model 604 to generate an object mask of the missing person. For example, the segmentation model 604 utilizes the bounding box around the missing person to generate an object mask (e.g., a separate layer) that, when applied to the second image, isolates the missing person from the rest of the second image. In some implementations, the image merging system generates an object mask for each user detected in the second image and/or the base image.

To further illustrate, in one or more implementations, when generating an object mask for the missing person in the second image, the segmentation model 604 can segment the pixels of the missing person from the other pixels in the image. For example, the segmentation model 604 can create a separate image layer that sets the pixels corresponding to the missing person to positive (e.g., binary 1) while setting the remaining pixels in the second image to a neutral or negative (e.g., binary 0). When this object mask layer is combined with the second image, only the pixels of the detected query object are visible. Indeed, the generated object mask can provide a segmentation that isolates of the missing person within the second image.

In various implementations, the segmentation model 604 can correspond to one or more deep neural networks or models that select an object based on bounding box parameters corresponding to the object within an image (i.e., the second image). For example, in one or more implementations, the segmentation model 604 utilizes the techniques and approaches found in Ning Xu et al., "Deep GrabCut for Object Selection," published Jul. 14, 2017, the entirety of which is incorporated herein by reference. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

As shown, the series of act 600 includes an act 610 of the image merging system generating a segmented image of the missing person. As mentioned above, the image merging system can utilize the segmentation model 604 to create an object mask of the missing person. Then, by applying the object mask to the second image, the image merging system can isolate the missing person. Further, the image merging system can generate a new image of only the missing person without other parts of the second image.

As mentioned above, in various implementations, the image merging system can determine that the missing person in the second image is part of a "couple" or is physical connected with a person recognized in both images. In these implementations, the image merging system can generate a segmented image that includes both the missing person and the recognized person. For example, if the missing person is holding the recognized person, the image merging system isolates, crops, and generates a segmented image of both the missing person and the recognized person.

FIG. 7A shows the image merging system updating the graphical user interface 302 to display the second image 308 with a bounding box 702 around the missing person 712 (e.g., the person missing from the base image). As shown, the second image 308 is displayed within the image editing application 304 on the client device 300, as introduced previously. In one or more implementations, the image merging system generates the bounding box 702 around the missing person 712 utilizing a segmentation model, as previously described. For example, the image merging system utilizes the detected face of the missing person 712 and the segmentation model to generate the bounding box 702 around the missing person.

FIG. 7B shows the image merging system generating an object mask 704 around the missing person 712 within the second image 308. For example, the image merging system generates an image layer that positively selects pixels associated with the missing person 712 from the second image 308 while negatively selecting other pixels within the second image 308. As described above, the image merging system can utilize a segmentation model to generate the object mask 704 around the missing person 712 within the second image 308.

FIG. 7C shows the image merging system generating a segmented image 706 of the missing person 712 from the second image 308. For example, in one or more implementations, the image merging system utilizes the object mask 704 to select the missing person 712 from the second image 308. Then, the image merging system copies the missing person 712 into a new image—the segmented image 706. In one or more implementations, the segmented model described above outputs the segmented image 706. In addition, the segmented model outputs the object mask 704 and the image merging system generates the segmented image 706 utilizing the object mask 704. While FIGS. 7A-7C illustrates the image merging system generating graphical user interfaces displaying steps of the segmentation process to the user, in other implementations, the image merging system segments the missing person without displaying these actions to a user. Indeed, the image merging system can perform the process of segmenting the missing persons as a background process that is transparent to a user.

Figure 8:
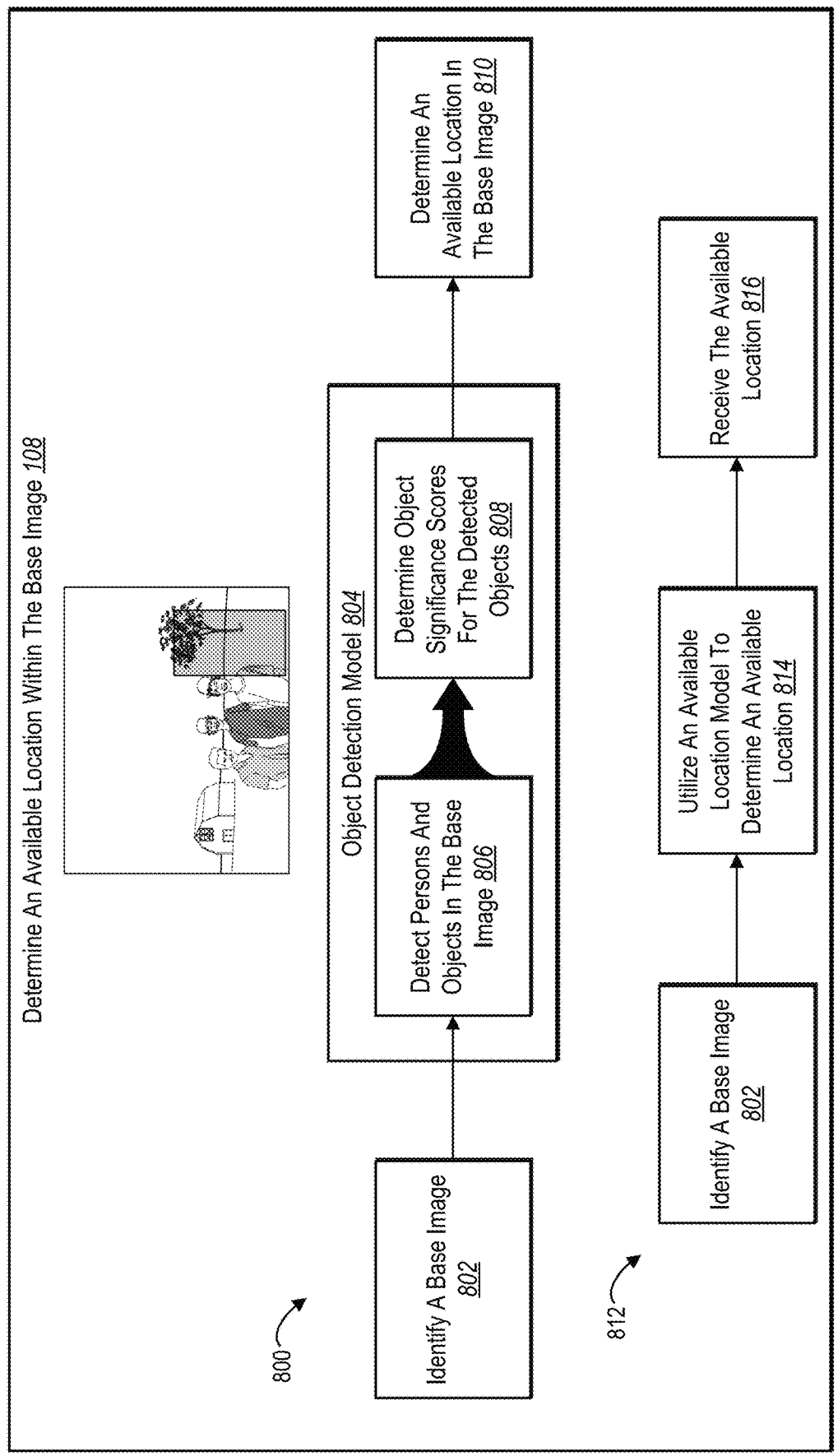
FIG. 8 illustrates flow diagrams of determining an available location within the base image in accordance with one or more implementations.
Figure 9A:
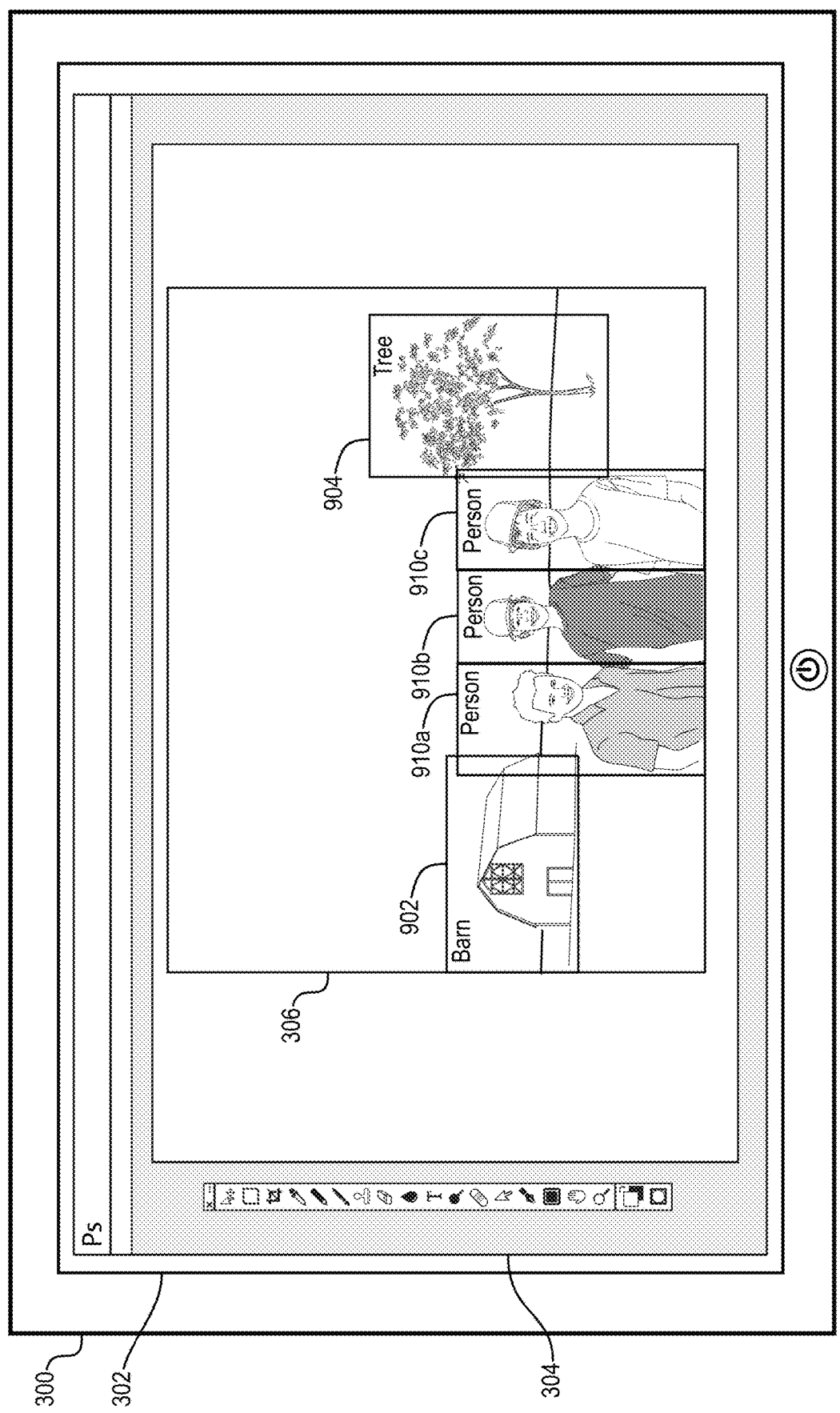
FIGS. 9A-9B illustrate a sequence of graphical user interfaces provided as part of determining an available location within a base image in accordance with one or more implementations.
Figure 9B:
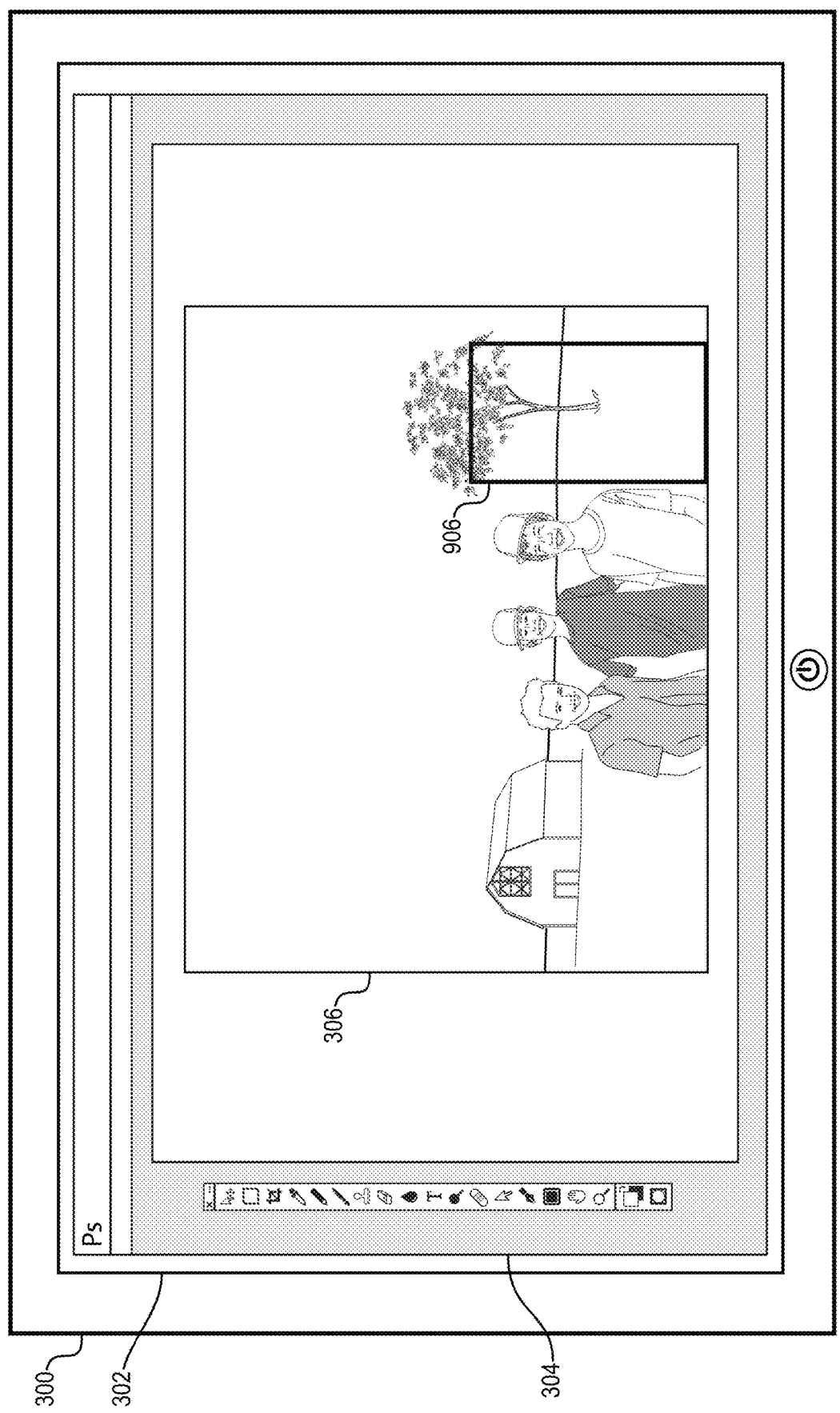

As mentioned above, FIGS. 8 and 9A-9B provide additional details regarding determining an available location in the base image to place the missing person. In particular, FIG. 8 illustrates flow diagrams of determining an available location within the base image in accordance with one or more implementations. FIGS. 9A-9B show corresponding graphical user interfaces illustrating acts in the process of determining an available location within the base image.

As shown, FIG. 8 includes a series of acts 800 of the image merging system determining an available location within the base image. As illustrated, the series of acts 800 includes an act 802 of the image merging system identifying a base image. For instance, the image merging system determines a base image as described above in connection with FIG. 2. For example, the image merging system selects the first provided or detected image in a set of images as the base image.

Additionally, the image merging system can utilize an object detection model 804 as part of determining an available location in the base image. As illustrated, the series of acts 800 includes an act 806 of the image merging system utilizing the object detection model 804 to detect persons and objects in the base image. For instance, in some implementations, the object detection model 804 is an object detection neural network, such as a concept embedding neural network. For example, the image merging system utilizes the object detection model 804 to identify and classify not only persons, but also objects, within the base image.

To illustrate, in some implementations, the image merging system can train an object detection neural network using training data that includes around 20,000 object classes and corresponding image samples. Through training, the object detection neural network can generate an image vector for each portion to the image (e.g., bounding boxes) that includes a detected object. Further, upon detecting an object, the image merging system can generate an approximate boundary (e.g., a bounding box) around the object within the base image as described above.

In one or more implementations, the object detection model (e.g., object detection neural network) can correspond to one or more deep neural networks or models that detect objects within an image. For example, the object detection model can utilize the techniques and approaches found in U.S. Patent Application Publication No. 2019/0286932, assigned to Adobe Inc. The entire contents of the foregoing application are hereby incorporated by reference in their entirety.

As shown, the series of acts 800 includes an act 808 of the image merging system utilizing the object detection model 804 to determine object significance scores for the detected objects. For example, in one or more implementations, as part of detecting objects within the base image, the object detection model 804 also classifies (e.g., assigns labels) to each detected object. In some implementations, different object classes can correspond to different object significance scores (or to a range of scores). For example, a person can have a high object significance score (or be in a higher score range) while a tree can have a low object significance score (or be in a lower score range).

In various implementations, the image merging system determines an object significance score based on multiple factors. To illustrate, the image merging system can determine an object significance score for an object based on the object's location (e.g., near the center or edge), size (e.g., large, medium, or small), orientation (e.g., front, size, or rear facing), frequency (e.g., single or multiple instances), depth (e.g., foreground or background), proximity (e.g., near people or other objects), and/or class. In addition, the image merging system can weight some factors over others when calculating the object significance score for each detected object in the base image.

In alternative implementations, the image merging system determines object significance scores based on the output of the object detection model 804. For example, upon the object detection model 804 detecting and/or classifying objects within the base image, the image merging system determines the object significance scores for the objects. For instance, the image merging system utilizes one or more of the factors provided above. In some implementations, the image merging system utilizes a lookup table to determine the object significance score of an object based in its object class and/or another factor.

As shown, the series of acts 800 includes an act 810 of the image merging system determining an available location in the base image. As mentioned above, an available location in the base image corresponds to a location in the base image that is vacant or otherwise available to add in the missing person. For example, locations in the base image that include people are unavailable locations. Similarly, locations in the base image that include objects with an object significance score above an object significance threshold are also unavailable locations.

In one or more implementations, the image merging system systematically selects the available location. For instance, the image merging system moves from left-to-right (or vice versa) within the base image to identify one or more potential available locations. In particular, the image merging system identifies locations in the base image that do not include people or significant objects (e.g., detected objects having an object significance score above an object significance threshold). Indeed, the image merging system can execute a for loop to determine potential locations within the base image that are empty or otherwise available.

In implementations where multiple potential available locations are identified, the image merging system can select the potential available location closest to another person as the available location. For example, the image merging system determines multiple potential available locations in the base image. In one or more instances, the image merging system selects the available location that is closest to a person. In some instances, the image merging system selects the available location that is closest to the center of the group. In these instances, the available location is often on the side of the group that includes less people, thus making the composite group photo appear more balanced.

In some implementations, the image merging system utilizes the size and dimensions of the segmented image to determine the available location. For example, the image merging system ensures that the missing person will fit within an identified available location (e.g., the missing person is not larger than the available location). In one or more implementations, the image merging system can first resize the segmented image of the missing person to match the size of other people detected in the base image before utilizing the size of the segmented image for purposes of determining the available location.

In various implementations, the image merging system can determine the available location in the base image based on one or more placement factors. As one example, the image merging system can identify an available location that is nearest the location where the missing person is located in the second image. For instance, if the missing person is located to the right of a group in the second image (or by a particular object), the image merging system can determine an available location located to the right of the group (or by the particular object) in the base image.

As another example, the image merging system can determine the available location based on relationships and/or connections. For instance, if the missing person is next to a given person that is detected in both images, the image merging system can determine the available location to be closest to the given person in the base image. As yet another example, the image merging system can identify connections between the missing person and each of the detected people in the base image (e.g., via social networking data, as described above). In these examples, the image merging system can determine the available location as being adjacent to the person to whom the missing person has the strongest connection and/or at least a threshold connection.

In one or more implementations, the image merging system can determine the available location based on a physical connection. As described above, the image merging system can determine a physical connection between the missing person and a given person in the second image. In these implementations, the image merging system can determine the available location as being adjacent to, or in front of, the given person. In some implementations, the image merging system can replace the given person in the base image with both the missing person and the given person from the base image, as further described below.

FIG. 8 also includes a series of acts 812 of the image merging system determining an available location within the base image. In particular, the image merging system can utilize the series of acts 812 as an alternative avenue to determine an available location in a base image. As shown, the series of acts 812 includes the act 802 of the image merging system identifying a base, which has been previously described above in connection with FIG. 8.

Further, the series of acts 812 includes an act 814 of the image merging system utilizing an available location model to determine an available location. For instance, the image merging system can train (or utilize) an available location model that predicts an optimal available location within the base image. For example, in one or more implementations, the image merging system trains an available location neural network based on a training dataset of group images to determine where to add an additional person to a group of people in a natural and realistic manner. Indeed, the available location neural network can learn an optimal available location based on the number of people in an image, the poses of each of persons, where people in an image are located, and/or the image's environment (e.g., indoor or outdoor).

In additional implementations, the image merging system can train the available location neural network as an adversarial neural network (e.g., a generative adversarial neural network (GAN)). For example, the image merging system trains a generative neural network to generate composite group photos (i.e., merged images) where a "missing person" is added to a base image of one or more people. Further, the image merging system trains an adversarial neural network (based on real group images) to determine if the generated composite group photos appears realistic. The image merging system can train both neural networks (e.g., in parallel or sequentially) until the generative neural network consistently generates realistic composite group photos that fool a well-trained adversarial neural network.

As shown, the series of acts 812 includes an act 816 of the image merging system receiving the available location. For example, the available location model provides a coordinate with respect to the base image that indicates the position of the available location within the base image. In alternative implementations, rather than providing the available location, the available location model instead generates a composite group photo that merges the segmented image of the missing person with the base image, as described above.

To illustrate, FIGS. 9A-9B show the image merging system updating the graphical user interface 302 to display the base image 306 and detected objects (including detected people) within the base image 306. As shown, the base image 306 is displayed within the image editing application 304 on the client device 300, as introduced previously.

As shown in FIG. 9A, the image merging system can generate bounding boxes around objects detected by the image merging system. For example, as described above, the image merging system utilizes an object detection neural network (i.e., an object detection model) to detect and classify objects within the base image 306. To illustrate, the image merging system detects a barn 902, a tree 904, and three men 910a, 910b, 910c. Further, as illustrated, the image merging system can generate a bounding box around each detected object.

In one or more implementations, the image merging system generates an object significance score for each of the objects. For example, the image merging system generates a score of 100 for each of the three men 910a-910c. In addition, the image merging system generates an object significance score of 65 for the barn 902. Further, the image merging system generates an object significance score of 40 for the tree 904. As described above, the image merging system can utilize a number of factors with respect to generating the object significance score for each detected object.

As shown in FIG. 9B, the image merging system can determine an available location 906 within the base image 306. For example, the image merging system determines if any spots next to the detected people are empty or unoccupied. As shown, the barn is to the left of the people and the tree is located to the right of the people. Upon not detecting an empty location or spot, the image merging system can determine if one of the locations in the base image 306 includes a less significant object (e.g., an object that can be blocked or covered).

Additionally, in one or more implementations, the image merging system compares the object significance score of each detected object to an object significance threshold. Given an object significance threshold of 50, the image merging system can determine that the barn 902 (with an object significance score of 65) is not insignificant while the tree 904 (with an object significance score of 40) is insignificant. Accordingly, the image merging system can determine the available location 906 as being in front of the tree 904, as shown in FIG. 9B.

As provided above, the image merging system can utilize various models and/or techniques to determine an available location in the base image 306. For example, the image merging system determines the available location based on the location of the missing person in the second image, relationship data, image aesthetics, and other factors, as described above in connection with FIG. 8.

While FIGS. 9A-9B illustrates the image merging system generating graphical user interfaces displaying steps of a process of determining an available location within the base image to the user, in other implementations, the image merging system determines an available location without displaying these actions to a user. Indeed, the image merging system can perform the process of determining an available location within the base image as a background process that is transparent to a user.

In one or more implementations, identifying the available location includes identifying a coordinate (e.g., on a pixel grid) and/or dimension (e.g., width and height) with respect to the base image 306. For example, the dimensions can correspond to the dimensions of the segmented image described above. Accordingly, the image merging system can utilize the located coordinates of the available location to place the segmented image, as will now be described.

Figure 10:
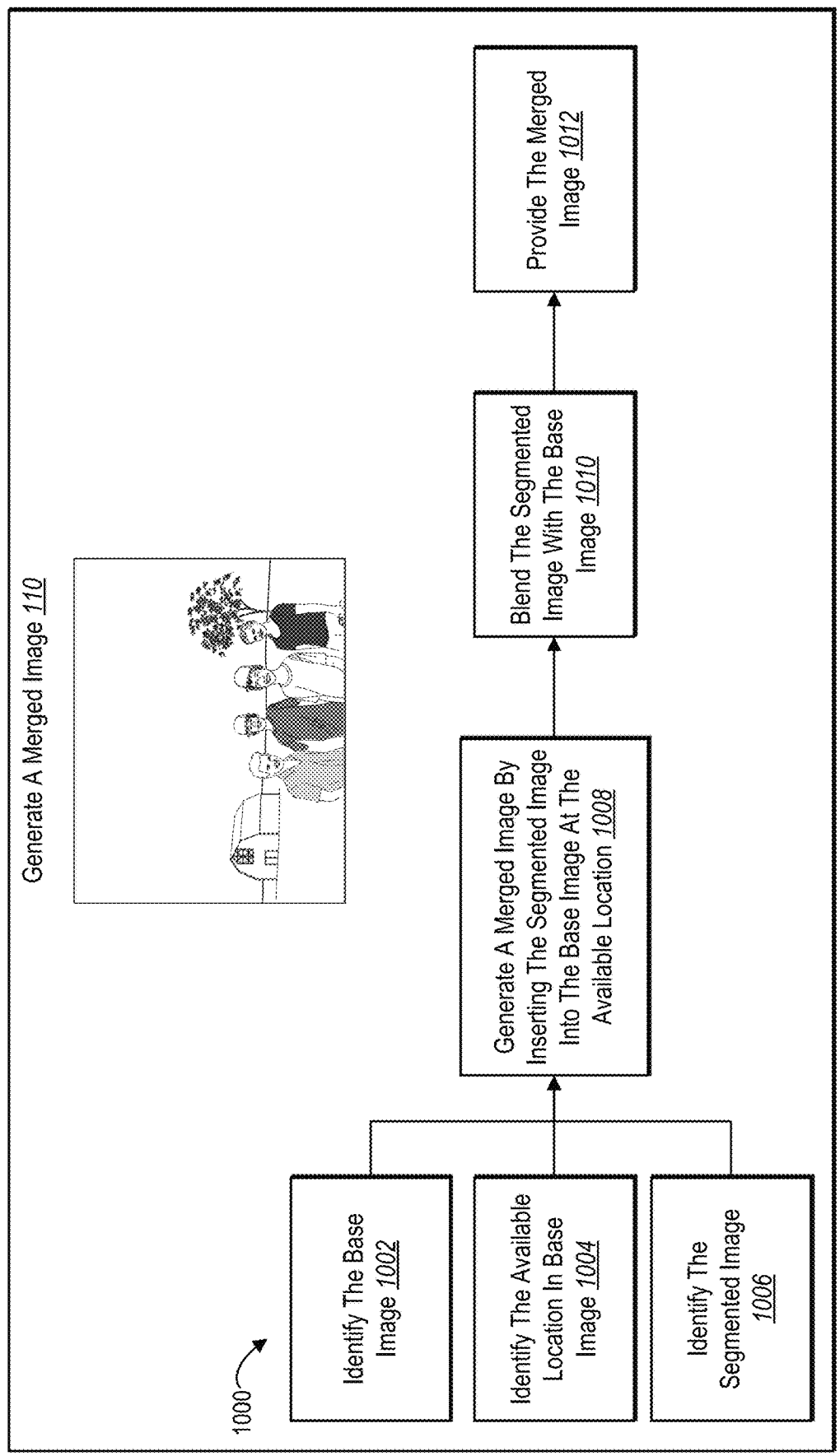
FIG. 10 illustrates a flow diagram of generating a merged image in accordance with one or more implementations.
Figure 11:
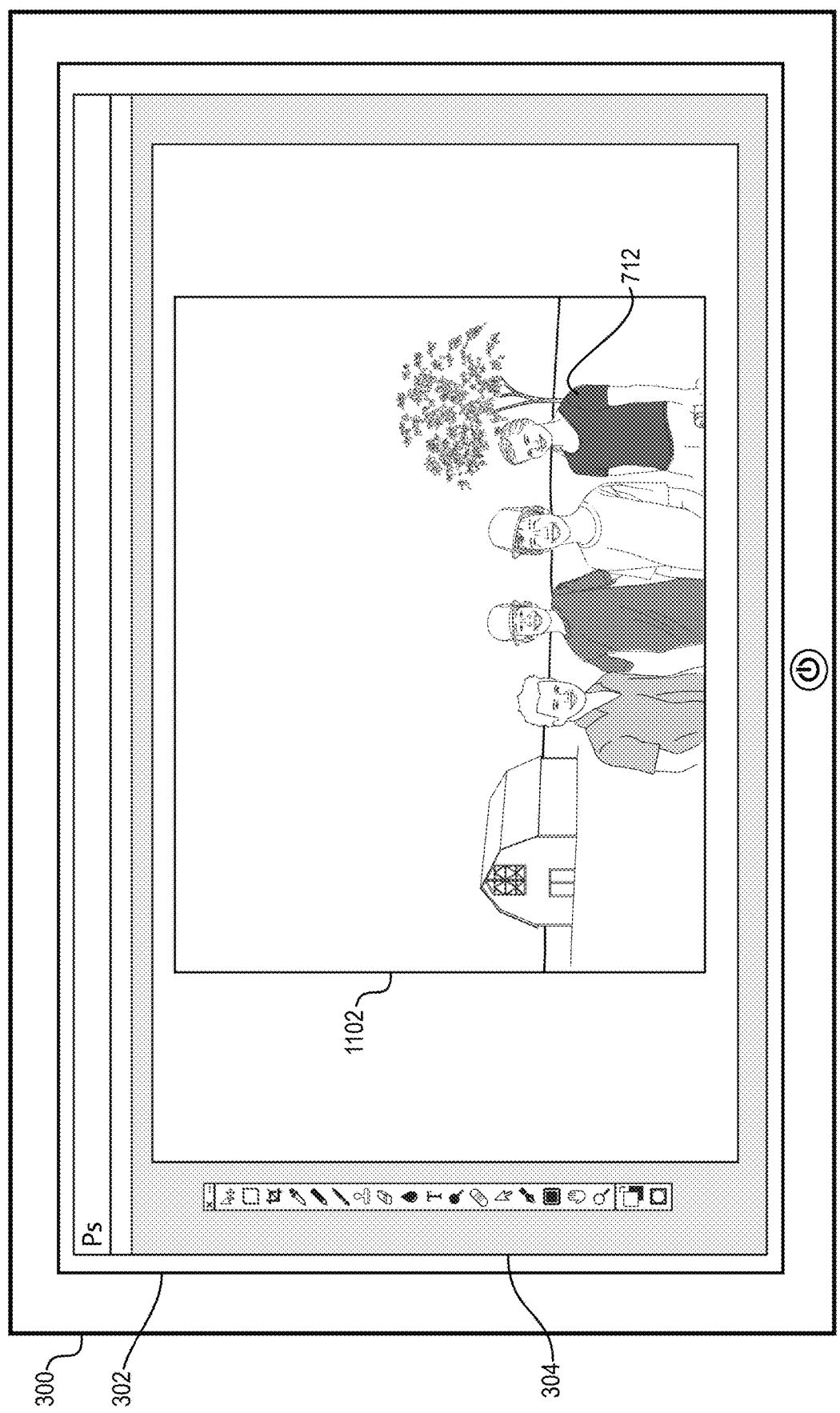
FIG. 11 illustrates a graphical user interface depicting a merged image in accordance with one or more implementations.

As mentioned above, FIGS. 10 and 11 provide additional details regarding generating a merged image. In particular, FIG. 10 provides a flow diagram of generating a merged image that includes each person included in the set of images (e.g., the base image and the second image). FIG. 11 shows the generated merged image (e.g., the composite group photo) within a graphical user interface.

As shown, FIG. 10 includes a series of acts 1000 of the image merging system generating a merged image in accordance with one or more implementations. As illustrated, the series of acts 1000 includes an act 1002 of the image merging system identifying (e.g., accessing, receiving, loading, and/or otherwise obtaining) the base image, an act 1004 of the image merging system identifying the available location in the base image, and an act 1006 of the image merging system identifying the segmented image. Each of the acts 1002-1006 are described previously.

Upon identifying the base image, the available location, and the segmented image, the image merging system can generate a merged image. As shown, the series of acts 1000 includes an act 1008 of the image merging system generating a merged image by inserting the segmented image into the base image at the available location. For example, in one or more implementations, the image merging system utilizes the coordinates determined for the available location in the base image to insert the segmented image of the missing person.

In some implementations, the image merging system can resize the segmented image in connection with generating the merged image. For example, the image merging system can compare body sizes and/or body feature sizes of the missing person in the segmented image to one or more people in the base image. For instance, the image merging system measures the face size of the missing person relative to the face size of a person in the base image to determine if the segmented image should be shrunk or enlarged. In this manner, the image merging system can ensure that the missing person has similar proportions to those in the base image.

As mentioned above, in one or more implementations, the image merging system can determine how close to locate the missing person to another person based on an identified relationship (e.g., a social connection) or a physical connection. For example, if the missing person is identified as the spouse of a person in the base image adjacent to the available location, the image merging system can position the missing person closer to their spouse. In implementations where there is a physical connection between the missing person and a given person, the image merging system can replace the given person in the base image with both the missing person and the given person from the second image. To illustrate, if the missing person has their arms around the given person in the second image, the image merging system can remove the given person from the base image and add the segmented image if the missing person with their arms around the given person. If the physical connection is between two people missing from the base image, the image merging system can add the "couple" from the second image to the base image.

As shown in FIG. 10, the series of acts 1000 includes an act 1010 of the image merging system blending the segmented image with the base image. For example, the image merging system can blend in portions of the background and/or foreground between the segmented image and the base image. In many implementations, if the two images are taken at the same location, the image merging system can easily match the background colors together. In some instances, blending includes adjusting the contrast, shading, hue, saturation, sharpness, and/or resolution of the segmented image to match the base image. In some implementations, the image merging system utilizes a blending model (e.g., a blending neural network) to blend the segmented image into the background image.

As also shown, the series of acts 1000 includes an act 1012 of the image merging system providing the merged image. For example, the image merging system provides the merged image to a client device associated with a user. In particular, the image merging system can provide the merged image to a user in response to a user request to generate the merged image from a set of images.

In some implementations, the image merging system provides the merged image within an image editing application and allows the user to further modify the merged image (e.g., the composite group photo). In alternative implementations, the image merging system provides a link to the merged image or a downloadable copy of the merged image to the user where the user can access, save, and/or share the merged image.

As mentioned above, in various implementations, the series of acts 1000 can be replaced by a generative neural network that automatically generates the merged image in connection with determining the optimal available location within the base image. For instance, the image merging system provides the segmented image to the trained generative neural network (which is trained as part of a GAN) and the generative neural network outputs the merged image, as described above.

In addition to adding missing people to the base image to generate a merged image, in one or more implementations, the image merging system can replace faces and/or people in the base image with corresponding faces and/or people from the second image. For instance, as described above, in connection with determining face matches between images, the image merging system can generate a rating (e.g., a photogenic score) for each face belonging to a person. If a person's face in the second image has a higher rating than in the base image, the image merging system can replace the person (or their face) in the base image. For example, if a person is looking at the camera in the second image but not in the base image, the image merging system can replace the person (or their face) in the base image with the corresponding instance from the second image. Again, the image merging system can utilize a blending model and/or other machine-learning model to ensure that the person appears realistic in the merged image.

In some additional implementations, the image merging system can blend the two faces together to raise the facial score in the base image. To illustrate, if the person's eyes are closed in the base image and open in the second image, the image merging system can copy and blend the person's eyes from the second image into the base image. Similarly, the image merging system can add a smile from the second image to a non-smiling face in the base image. In these instances, the image merging system can utilize a face blending machine-learning model (and/or an adversarial model) to ensure that the merged image appears natural and realistic.

FIGS. 2, 4, 6, 8, and 10 and the identified corresponding text describe various implementations of generating a merged image. Accordingly, the actions and algorithms described in connection with at least these figures provide example structure and algorithms for performing a step for merging a second person (e.g., a missing person) into the first image (e.g., the base image). Indeed, the flow charts described in connection with FIGS. 2, 4, 6, 8, and 10 provide structure for one or more of the algorithms corresponding to the image merging system generating a merged image from a set of images (e.g., a base image and a second image).

FIG. 11 shows the generated merged image, as mentioned above. In particular, FIG. 11 illustrates a graphical user interface of a merged image in accordance with one or more implementations. As shown, the image merging system updates the graphical user interface 302 to show the merged image 1102. Indeed, the merged image 1102 is displayed within the image editing application 304 on the client device 300, as introduced previously.

As shown, the merged image 1102 includes the missing person 712 from the second image. In particular, the merged image 1102 shows the missing person 712 placed next to the group of people from the base image and in front of the tree (e.g., an insignificant object). Further, as shown, the merged image 1102 appears natural and realistic, as if the missing person 712 was in the image at the time it was captured.

As mentioned previously, while the graphical user interface 302 of the client device 300 (e.g., as shown in FIGS. 3A-3B, 5, 7A-7C, 9A-9B, and 11) illustrates display updates in response to the image merging system generating the merged image 1102, in many implementations, the image merging system generates the merged image 1102 without displaying intermediary steps to a user. For example, the image merging system displays the graphical user interface shown in FIG. 3A, then jumps to the merged image 1102 shown in FIG. 11. In alternative implementations, the image merging system displays one or more updates of the graphical user interface 302 corresponding to an intermediary action, for example, based on a user request and/or user preferences.

One will appreciate in light of the disclosure herein that the image merging system can automatically merge one or more persons into an image. In other words, the image merging system can use intelligent neural networks to perform one or more of identifying a base image, identifying a missing person, segmenting the missing person, determining an available location within the base image, and blending the segmented missing person into the available location within the base image without user input. Furthermore, the image merging system integrates the concepts of identifying a base image, identifying a missing person, segmenting the missing person, determining an available location within the base image, and blending the segmented missing person into the available location within the base image into a practical application in the form of a system that automatically merges one or more persons into an image. Indeed, the system can comprise a software application executing on a client device that greatly reduces the number of user interfaces and user input needed to generate a merged image.

While the above disclosure corresponds to adding missing persons to a group photo, in various implementations, the image merging system can similarly add other objects, such as animals or memorabilia to a base image. For example, the image merging system identifies a base image that includes two people and a second image that includes a dog. Here, the image merging system can generate a merged image that adds the dog to the base image using the techniques and approaches described above.

Figure 12:
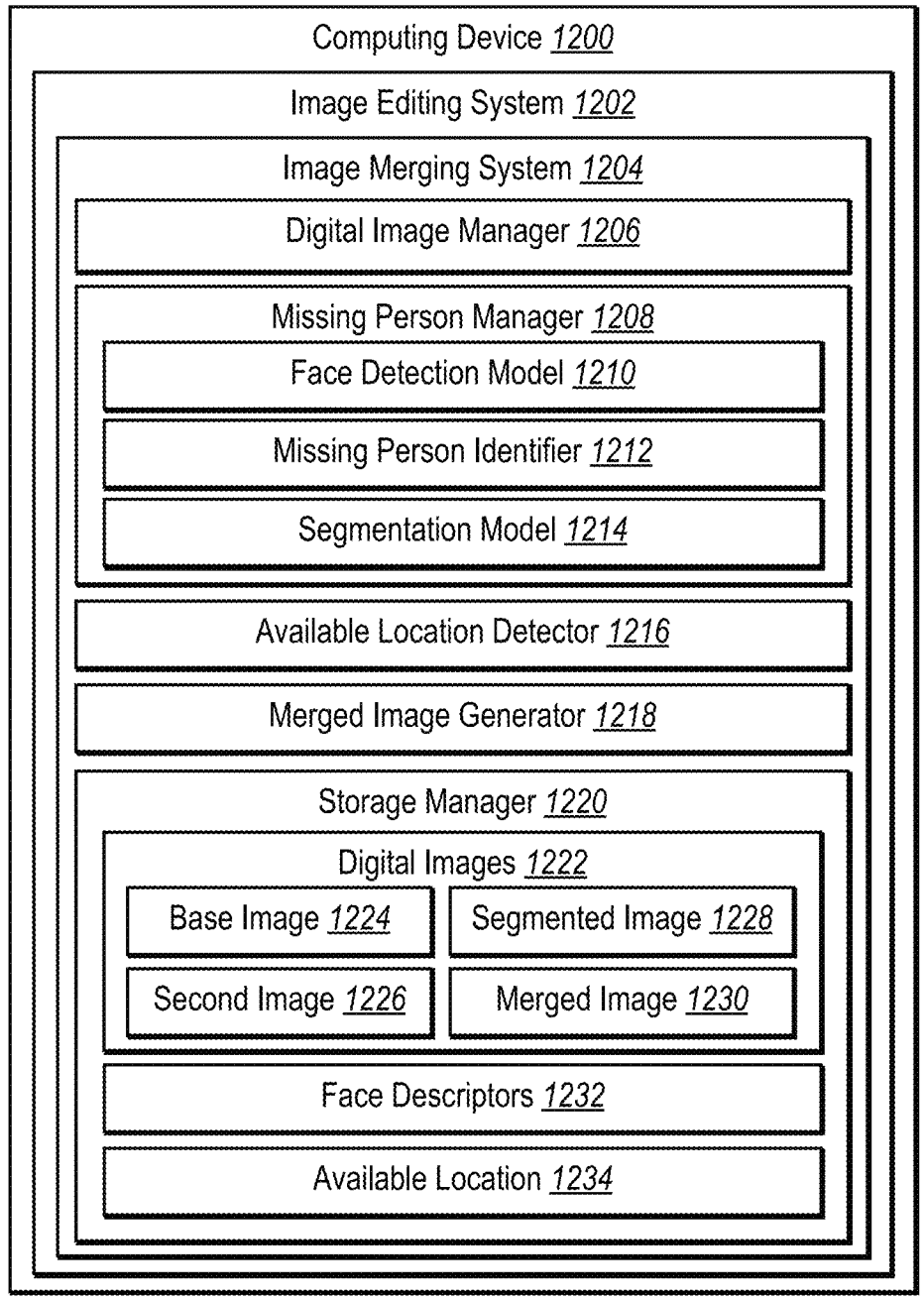
FIG. 12 illustrates a schematic diagram of the image merging system in accordance with one or more implementations.

Referring now to FIG. 12, additional detail is provided regarding capabilities and components of the image merging system described herein in accordance with one or more implementations. In particular, FIG. 12 shows a schematic diagram of an example architecture of the image merging system 1204 implemented within an image editing system 1202 and hosted on a computing device 1200.

In general, the computing device 1200 may represent various types of client devices. For example, in some implementations, the client is a mobile device, such as a laptop, a tablet, a mobile telephone, a smartphone, etc. In other implementations, the computing device 1200 is a non-mobile device, such as a desktop or server, or another type of client device. Additional details with regard to the computing device 1200 are discussed with respect to FIG. 15.

As mentioned above, in the illustrated implementation, the image editing system 1202 implements the image merging system 1204. In one or more implementations, the image editing system enables a user to modify or change an image as well as generate new images. To illustrate, the image editing system 1202 can facilitate the creation, modification, sharing, and/or deletion of digital images within applications. For instance, the image editing system 1202 provides a variety of tools related to image creation and editing (e.g., photo-editing). For example, the image editing system 1202 provides selection tools, color correction tools, and image manipulation tools. Moreover, the image editing system 1202 can operate in connection with one or more applications to generate or modify images.

As illustrated in FIG. 12, the image merging system 1204 includes various components for performing the actions, techniques, processes and features described herein. For example, the image merging system 1204 includes a digital image manager 1206, a missing person manager 1208, an available location detector 1216, a merged image generator 1218, and a storage manager 1220. As shown, the missing person manager 1208 includes a face detection model 1210, a missing person identifier 1212, and a segmentation model 1214. Also, the storage manager 1220 includes digital images 1222 (having a base image 1224, a second image 1226, a segmented image 1228, and a merged image 1230), face descriptors 1232, and an available location 1234.

As mentioned above, the image merging system 1204 includes the digital image manager 1206. In general, the digital image manager 1206 facilitates identifying, accessing, receiving, obtaining, capturing, generating, importing, exporting, copying, modifying, removing, and organizing images. In one or more implementations, the digital image manager 1206 operates in connection with the image editing system 1202 (e.g., an image editing application) to access and edit images, as described previously. In some implementations, the digital image manager 1206 communicates with the storage manager 1220 to store and retrieve the digital images 1222, for example, within a digital image database managed by the storage manager 1220.

In various implementations, the digital image manager 1206 can receive a set of images (e.g., at least two images) and determine a base image 1224 and a second image 1226 from the image set. For example, in one or more implementations, as described above, the digital image manager 1206 designates the first image receives as the base image 1224. In some implementations, the digital image manager 1206 receives user input designating the base image 1224 and/or the second image 1226.

As shown, the image merging system 1204 includes the missing person manager 1208. In general, the missing person manager 1208 detects a person in the second image 1226 that is missing from the base image 1224. In addition, the missing person manager 1208 can isolate the missing person and/or create a segmented image 1228 of the missing person, as detailed above. As shown, the missing person manager 1208 includes a face detection model 1210, a missing person identifier 1212, and a segmentation model 1214.

In one or more implementations, the face detection model 1210 can detect faces within a set of images. For example, as described above, a face detection model 1210 can detect faces of persons within a base image 1224 and a second image 1226. In some implementations, the face detection model 1210 is a machine-learning model and/or a neural network. For example, the missing person manager 1208 trains the face detection model 1210 to detect faces in images. In an alternative example, the missing person manager 1208 obtains a pre-trained face detection model 1210. In additional implementations, the missing person manager 1208 can utilize the face detection model 1210 to generate face descriptors 1232 for faces detected within the images.

As described above, face descriptors 1232 can include a vector of facial feature values that distinctively characterizes a person's face.

In various implementations, the missing person identifier 1212 determines a person included in the second image 1226 that is missing from the base image 1224. For example, the missing person identifier 1212 utilizes the face descriptors 1232 and a face similarity threshold to determine matching persons (e.g., below the threshold) as well as missing persons (e.g., above the threshold), as described above. In some implementations, the missing person identifier 1212 utilizes clustering or other grouping techniques to determine a person in the second image 1226 that is missing from the base image 1224.

In some implementations, the segmentation model 1214 can generate a segmented image 1228 that isolates the missing person from the second image 1226. As described above, the segmentation model 1214 can be a machine-learning model and/or a neural network that generates the segmented image 1228. Further, as described above, the segmentation model 1214 can generate a bounding box around the missing person, create an object mask based on the bounding box, and generate the segmented image 1228 based on the object mask. In some implementations, the segmentation model 1214 generates an object mask for each person detected in the second image 1226 and/or the base image 1224.

As shown, the image merging system 1204 includes the available location detector 1216. In one or more implementations, the available location detector 1216 determines an available location 1234 within the base image 1224. For example, the available location detector 1216 can utilize a systematic approach (e.g., a for loop) to determine the available location 1234. As another example, the available location detector 1216 can utilize one or more weighted factors to determine the available location 1234, as described above, such as detected objects, object classifications, object positions, relationships and/or connections.

As shown, the image merging system 1204 also includes the merged image generator 1218. In one or more implementations, the merged image generator 1218 smoothly inserts the segmented image 1228 of the missing person into the base image 1224 based on the available location 1234 to generate a merged image 1230. The merged image generator 1218 can utilize one or more methods, techniques, approaches, or models (e.g., machine-learning models or neural networks) to generate the merged image 1230, as described above. For example, the merged image generator 1218 utilizes a blending machine-learning model to blend the foreground and/or background colors of the segmented image 1228 with the base image 1224 to generate the merged image 1230.

As shown, the image merging system 1204 includes the storage manager 1220. In various implementations, various components of the image merging system 1204 communicate with the storage manager 1220 to store, access, and utilize retained data. In some implementations, the storage manager 1220 is located on the computing device 1200. Additionally, or in the alternative, the storage manager 1220 is located on a remote computing device, such as within cloud storage. As shown, the storage manager 1220 includes the digital images 1222, face descriptors 1232, and an available location 1234. Further, the digital images 1222 include a base image 1224, a second image 1226, a segmented image 1228, and a merged image 1230.

Each of the components 1210-1234 of the image merging system 1204 can include software, hardware, or both. For example, the components 1210-1234 can include one or more instructions stored on a computer-readable storage medium and executable by processors of one or more computing devices, such as a client device (e.g., a mobile client device) or server device. When executed by the one or more processors, the computer-executable instructions of the image merging system 1204 can cause a computing device to perform the feature learning methods described herein. Alternatively, the components 1210-1234 can include hardware, such as a special-purpose processing device to perform a certain function or group of functions. In addition, the components 1210-1234 of the image merging system 1204 can include a combination of computer-executable instructions and hardware.

Furthermore, the components 1210-1234 of the image merging system 1204 may be implemented as one or more operating systems, as one or more stand-alone applications, as one or more modules of an application, as one or more plug-ins, as one or more library functions or functions that may be called by other applications, and/or as a cloud-computing model. Thus, the components 1210-1234 may be implemented as a stand-alone application, such as a desktop or mobile application. Additionally, the components 1210-1234 may be implemented as one or more web-based applications hosted on a remote server. The components 1210-1234 may also be implemented in a suite of mobile device applications or "apps." To illustrate, the components 1210-1250 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Inc. in the United States and/or other countries.

Figure 13:
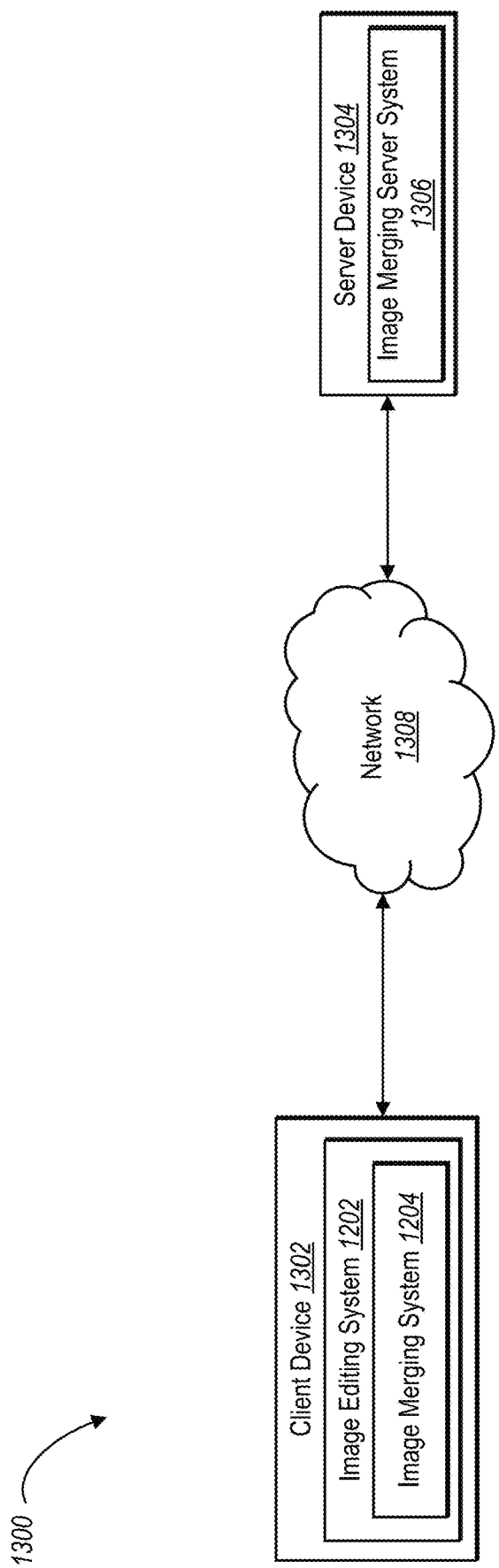
FIG. 13 illustrates a system environment in which the image merging system can operate in accordance with one or more implementations.

FIG. 13 illustrates a schematic diagram of a system 1300 in which the image merging system 1204 can operate in accordance with one or more implementations. As shown in FIG. 13, the system 1300 includes a client device 1302 and a server device 1304 connected via a network 1308. Additional detail regarding computing devices (e.g., the client device 1302 and the server device 1304) is provided below in connection with FIG. 15. Further, FIG. 15 also provides detail regarding networks, such as the illustrated network 1308.

Although FIG. 13 illustrates a particular number, type, and arrangement of components within the system 1300, various additional environment configurations are possible. For example, the server device 1304 can represent a set of connected server devices. As another example, the system 1300 can include an additional number of client devices. As a further example, the client device 1302 may communicate directly with the server device 1304, bypassing the network 1308 or utilizing a separate and/or additional network.

As shown, the client device 1302 includes the image merging system 1204 implemented within the image editing system 1202, which is described above. In one or more implementations, the image merging system 1204 operates on a client device without the image editing system 1202. For example, the image merging system 1204 is a stand-alone application that operates on the client device 1302.

As shown, the system 1300 includes the server device 1304 implementing an image editing server system 1306. In one or more implementations, the image editing server system 1306 communicates with the image merging system 1204 on the client device 1302 to facilitate the functions, operations, and actions previously described above with respect to the image merging system 1204. For example, the image editing server system 1306 can provide digital content (e.g., a web page) to a user on the client device 1302 and facilitate generating merged images from a set of images via a network-provided graphical user interface.

Moreover, in one or more implementations, the image editing server system 1306 on the server device 1304 can include all, or a portion of, the image merging system 1204. For example, the image merging system described herein is located on the server device 1304 as the image editing server system 1306, which is accessed by a user via an application on the client device 1302. In some implementations, the client device 1302 can download all or a portion of a software application corresponding to the image merging system 1204 such that at least a portion of the operations performed by the image merging system 1204 occur on the client device 1302.

FIGS. 1-13, the corresponding text, and the examples provide a number of different methods, systems, devices, and non-transitory computer-readable media of the image merging system 1204. In addition to the foregoing, one or more implementations can also be described in terms of flowcharts comprising acts for accomplishing a particular result, such as the flowcharts of acts shown in FIG. 14. Additionally, the acts described herein may be repeated or performed in parallel with one another or parallel with different instances of the same or similar acts.

Figure 14:
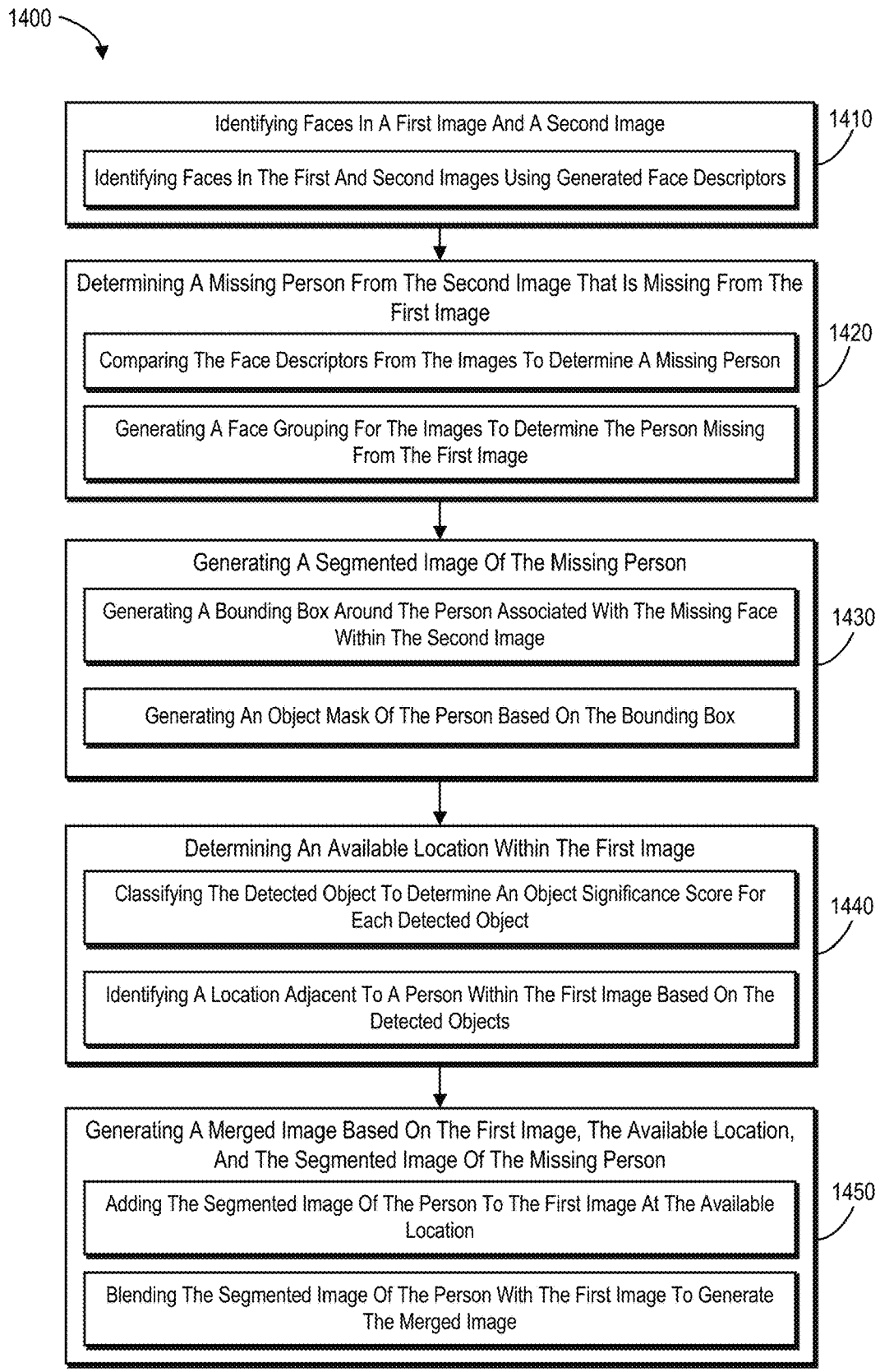
FIG. 14 illustrates a flowchart of a series of acts for automatically merging missing objects within digital images into a composite digital image in accordance with one or more implementations.

As mentioned, FIG. 14 illustrates a flowchart of a series of acts 1400 for automatically merging missing objects within digital images into a composite digital image (i.e., merged image) in accordance with one or more implementations. While FIG. 14 illustrates acts according to one implementation, alternative implementations may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some implementations, a system can perform the acts of FIG. 14.

In one or more implementations, the series of acts 1400 is implemented on one or more computing devices, such as the client device 1302, the server device 1304, or the computing device 1200. In addition, in some implementations, the series of acts 1400 is implemented in a digital environment for creating or editing digital content (e.g., digital images). For example, the series of acts 1400 is implemented on a computing device having memory that includes a first image having faces of one or more persons, a second image having faces of one or more persons where a person in the second image is not in the first image, a face detection model, and/or a segmentation model.

The series of acts 1400 includes an act 1410 of identifying faces in a first image and a second image. In particular, the act 1410 can involve identifying one or more faces in a first image and one or more faces in a second image utilizing a face detection model. In particular, act 1410 can involve identify, utilizing a face detection model, pixels representing one or more faces in a first image and pixels representing one or more faces in a second image. In one or more implementations, the act 1410 can include generating face descriptors for the one or more faces in the first image and the one or more faces in the second image utilizing the face detection model. In some implementations, the generated face descriptors include low-dimensional facial feature vectors, high-dimensional facial feature vectors, or a combination of higher-dimensional and lower-dimensional facial feature vectors. In various implementations, the act 1410 includes identifying a first image with at least a first person and identifying a second image with at least a second person that is missing from the first image.

As shown, the series of acts 1400 also includes an act 1420 of determining a missing person from the second image that is missing from the first image. In particular, the act 1420 can involve determining a missing face from the one or more faces in the second image that is missing from (e.g., not included in the one or more faces) in the first image (e.g., not included in the one or more faces in the first image). For example, act 1420 can involve determining a missing face from the one or more faces in the second image that does not appear the first image by analyzing the pixels representing the one or more faces in the first image and the pixels representing the one or more faces in the second image. In one or more implementations, the act 1420 includes comparing the face descriptors from the first image to the face descriptors in the second image to determine a missing person that is not in the first image. In some implementations, the act 1420 includes comparing the face descriptors for the one or more faces in the first image to the face descriptors for the one or more faces in the second image.

In additional implementations, the act 1420 includes generating a grouping for each face in the second image that has a face descriptor that is within a similarity threshold of a face descriptor of a face in the first image and determining the missing face in the second image based on the missing face not belonging to a grouping (e.g., a grouping of different faces in different images belonging to the same person). In some implementations, the act 1420 includes determining the missing person in the second image by determining that the face descriptors corresponding to the faces detected in the first image are above (e.g., exceed or do not satisfy) a face similarity threshold when compared to the face descriptor for the missing person in the second image.

As shown in FIG. 14, the series of acts 1400 further includes an act 1430 of generating a segmented image of the missing person. In particular, the act 1430 can include generating, utilizing a segmentation model, a segmented image of a missing person in the second image associated with the missing face. In one or more implementations, the act 1430 includes generating a segmented image of the missing person not in the first image utilizing a segmentation model. For example, act 1430 can involve generating, utilizing a segmentation model, a segmented image of a missing person in the second image associated with the missing face by segmenting pixels of the second image representing the missing person. Additionally, in some implementations, the act 1430 includes utilizing the segmentation model to generating a bounding box around a body associated with the missing face within the second image, generating the object mask of the person based on the bounding box, and generate the segmented image based on applying the object mask to the second image.

As shown, the series of acts 1400 also includes an act 1440 of determining an available location within the first image. In one or more implementations, the act 1440 can include determining an available location within the first image based on detecting object and persons in the first image. For example, act 1440 can involve determining an available location within the first image by detecting objects within the first image and identifying a portion of the first image that does not include a person. In some implementations, the act 1440 can include detecting objects and persons within the first image utilizing an object detection neural network, classifying the detected object to determine an object significance score for each detected object, and identifying a location adjacent to one of the persons within the first image that does not have an object and/or has an object with an object significance score below an object significance threshold. In various implementations, the act 1440 can include utilizing a generative adversarial neural network (GAN) or portion thereof to determine the available location.

As shown, the series of acts 1400 also includes an act 1450 of generating a merged image based on the first image, the available location, and the segmented image of the missing person. For example, act 1450 can involve generating a merged image by inserting the pixels of the second image representing the missing person into the available location of the first image. In one or more implementations, the act 1450 includes generating a merged image (e.g., modified first image) by inserting the person that is missing from the first image into the available location in the first image utilizing the segmented image of the missing person and a blending model. In some implementations, the act 1450 includes adding the segmented image of the person to the first image at the available location and blending the segmented image of the person with the first image to generate the merged image (i.e., the modified first image).

In various implementations, the act 1450 also includes blending the segmented image of the person with the first image to generate the merged image by blending foreground colors of the segmented image of the person with foreground colors of the first image and blending background colors of the segmented image of the person with background colors of the first image.

The series of acts 1400 can also include a number of additional acts. In various implementations, the series of acts 1400 includes the act of providing the merged first image with the first person and the second person to a client device associated with a user. In various implementations, the series of acts 1400 includes the act of determining that the first image is captured within a threshold time and location of the second image. In additional implementations, the series of acts 1400 includes the act of determining that the first image and the second image are captured with a common (i.e., the same) image capturing device.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image merging system to create, generate, and/or modify the digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
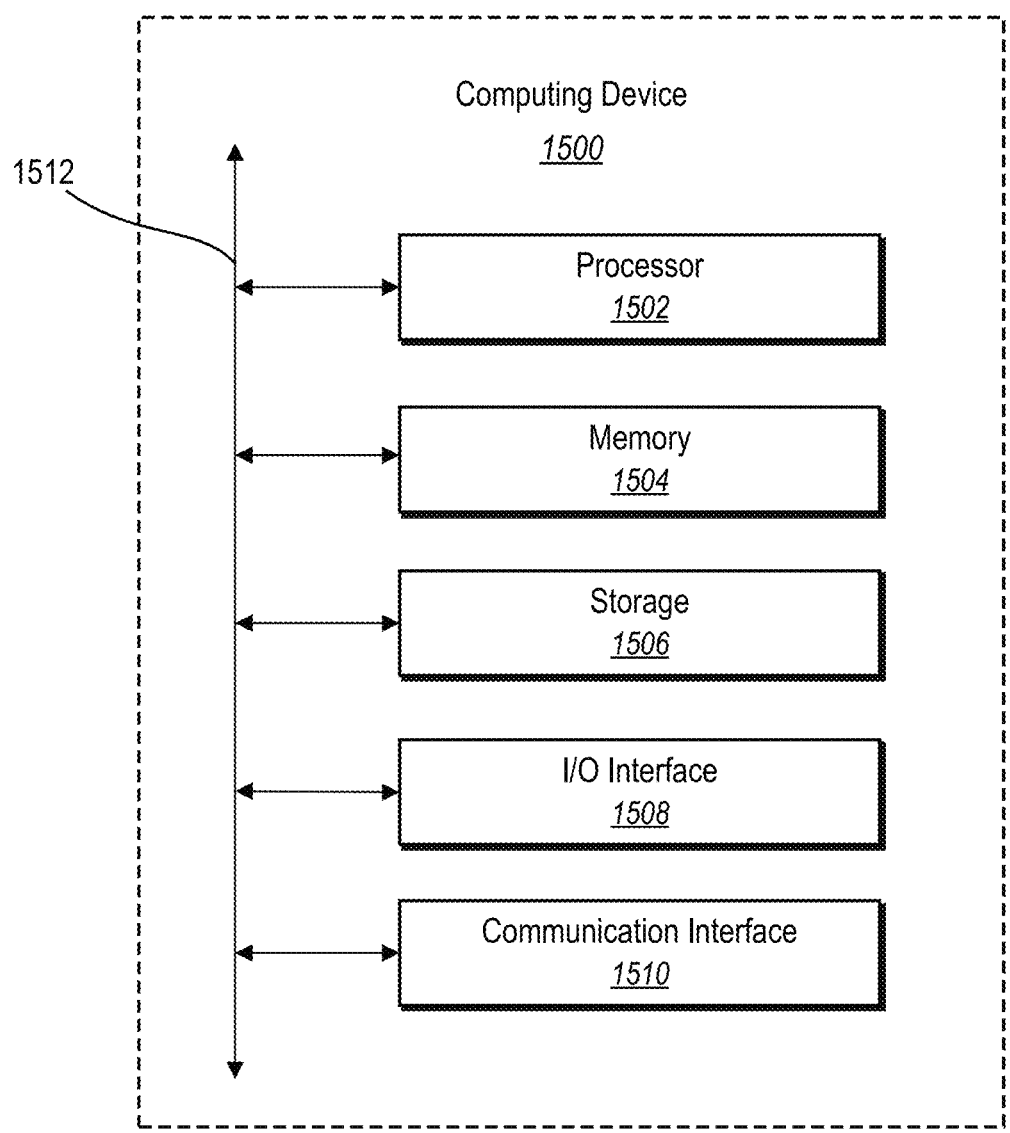
FIG. 15 illustrates a block diagram of an example computing device for implementing one or more implementations of the present disclosure.

FIG. 15 illustrates a block diagram of an example computing device 1500 that may be configured to perform one or more of the processes described above. One will appreciate that one or more computing devices, such as the computing device 1500 may represent the computing devices described above (e.g., the client device 1302, the server device 1304, or the computing device 1200). In one or more implementations, the computing device 1500 may be a mobile device (e.g., a laptop, a tablet, a smartphone, a mobile telephone, a camera, a tracker, a watch, a wearable device, etc.). In some implementations, the computing device 1500 may be a non-mobile device (e.g., a desktop computer, a server device, a web server, a file server, a social networking system, a program server, an application store, or a content provider). Further, the computing device 1500 may be a server device that includes cloud-based processing and storage capabilities.

As shown in FIG. 15, the computing device 1500 can include one or more processor(s) 1502, memory 1504, a storage device 1506, input/output ("I/O") interfaces 1508, and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other implementations. Furthermore, in certain implementations, the computing device 1500 includes fewer components than those shown in FIG. 15. Components of the computing device 1500 shown in FIG. 15 will now be described in additional detail.

In particular implementations, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (e.g., user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of these I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   generate, utilizing a face detection model, facial feature vectors for pixels representing one or more faces associated with one or more persons in a first image and a facial feature vector for pixels representing an additional face associated with an additional person in a second image;
   determine that the additional face is a missing face that does not appear in the first image by comparing the facial feature vectors for the one or more faces in the first image and the facial feature vector for the additional face in the second image;
   generate, utilizing a segmentation model, a segmented image of a missing person associated with the missing face by segmenting pixels of the second image representing the additional person associated with the additional face;
   determine an available location within the first image by detecting objects within the first image and identifying a portion of the first image that does not include a person; and
   generate a merged image by inserting the segmented image into the available location within the first image.

2. The non-transitory computer-readable medium of claim 1, wherein comparing the facial feature vectors for the one or more faces in the first image and the facial feature vector for the additional face in the second image comprises determining similarity scores for the additional face in the second image relative to the facial feature vectors for the one or more faces in the first image.

3. The non-transitory computer-readable medium of claim 1, wherein comparing the facial feature vectors for the one or more faces in the first image and the facial feature vector for the additional face in the second image comprises determining distances from the facial feature vector for the additional face to the facial feature vectors for the one or more faces in a multi-dimensional space.

4. The non-transitory computer-readable medium of claim 1, wherein the instructions cause the computing device to determine that the additional face is a missing face that does not appear in the first image by:
   generating, across a plurality of images depicting the one or more faces in the first image, respective groupings for the one or more faces according to similarities between facial feature vectors of the plurality of images; and determining that the additional face is missing from the first image by determining that the facial feature vector for the additional face does not belong to a grouping of the respective groupings.

5. The non-transitory computer-readable medium of claim 1, wherein the instructions cause the computing device to generate the segmented image of the missing person associated with the missing face by utilizing the segmentation model to:

generate a bounding box around a body associated with the missing face within the second image;

generate an object mask of the person based on the bounding box; and generate the segmented image based on applying the object mask to the second image.

6. The non-transitory computer-readable medium of claim 1, further comprising instructions that, when executed by the at least one processor, cause the computing device to:

generate bounding boxes around each of the one or more faces in the first image and the additional face in the second image; and generate the facial feature vectors for the one or more faces in the first image and the facial feature vector for the additional face in the second image by extracting latent features from portions of the first image and the second image corresponding to the bounding boxes.

7. The non-transitory computer-readable medium of claim 1, wherein the instructions cause the computing device to determine the available location within the first image by detecting objects within the first image and identifying a portion of the first image that does not include a person by:

detecting the objects within the first image utilizing an object detection neural network;

classifying the detected objects to determine an object significance score for each detected object; and identifying a location adjacent to one of the one or more persons within the first image that does not have an object or that has an object with an object significance score below an object significance threshold.

8. The non-transitory computer-readable medium of claim 1, wherein the instructions cause the computing device to generate the merged image by:

adding the segmented image of the missing person to the first image at the available location; and blending the segmented image of the missing person with the first image to generate the merged image.

9. The non-transitory computer-readable medium of claim 8, wherein the instructions cause the computing device to blend the segmented image of the missing person with the first image to generate the merged image by:

blending foreground colors of the segmented image with foreground colors of the first image; and blending background colors of the segmented image with background colors of the first image.

10. The non-transitory computer-readable medium of claim 1, further comprising instructions that, when executed by the at least one processor, cause the computing device to determine that the first image is captured within a threshold time and a threshold distance of the second image.

11. A system comprising:

one or more memory devices comprising:

a first image having one or more faces of one or more persons;

a second image having an additional face of an additional person, wherein the additional person is not in the first image;

a face detection neural network; and a segmentation model; and one or more computing devices configured to cause the system to:

generate face descriptors for the one or more faces in the first image and a face descriptor for the additional face in the second image utilizing the face detection neural network;

compare the face descriptors of the one or more faces from the first image to the face descriptor of the additional face from the second image to determine that the additional face is a missing face that does not appear in the first image;

generate, utilizing a segmentation model, a segmented image of a missing person associated with the missing face;

determine an available location within the first image based on detecting objects and the one or more persons in the first image; and generate a merged image by inserting the missing person into the available location in the first image utilizing the segmented image of the missing person and a blending model.

12. The system of claim 11, wherein the one or more computing devices are configured to cause the system to generate the face descriptors comprising facial feature vectors by extracting latent features, utilizing the face detection neural network, from portions of the first image corresponding to the one or more faces and portions of the second image corresponding to the additional face in the second image.

13. The system of claim 11, wherein the one or more computing devices are configured to cause the system to compare the face descriptors from the first image to the face descriptor from the second image by determining a distance between the face descriptors within a multi-dimensional space.

14. The system of claim 11, wherein the one or more computing devices are configured to cause the system to determine that the additional face is missing from the first image by determining that the face descriptors for the one or more faces in the first image do not satisfy a face similarity threshold when compared to the face descriptor for the additional face in the second image.

15. The system of claim 11, wherein the one or more computing devices are configured to cause the system to generate the segmented image by:

generating a bounding box around a body associated with the missing person within the second image;

generating an object mask of the missing person based on the bounding box; and generating the segmented image of the missing person based on applying the object mask to the second image.

16. The system of claim 11, wherein the one or more computing devices are configured to cause the system to determine the available location within the first image by:

detecting the objects in the first image utilizing an object detection neural network;

classifying the detected objects in the first image to determine an object significance score for each detected object; and identifying the available location adjacent to one of the one or more persons within the first image that does not have an object or that has an object with an object significance score below an object significance threshold.

17. The system of claim 11, wherein the one or more computing devices are configured to cause the system to generate the merged image by:
adding the segmented image of the missing person to the first image at the available location; and
blending the segmented image of the missing person with the first image to generate the merged image utilizing the blending model.

18. In a digital medium environment for creating or editing digital images, a computer-implemented method of automatically merging missing objects within the digital images into a composite digital image, comprising:
generating, utilizing a face detection model, facial feature vectors for pixels representing one or more faces associated with one or more persons in a first image and a facial feature vector for pixels representing an additional face associated with an additional person in a second image;
determining that the additional face is a missing face that does not appear in the first image by comparing the facial feature vectors for the one or more faces in the first image and the facial feature vector for the additional face in the second image;
generating, utilizing a segmentation model, a segmented image of a missing person associated with the missing face by segmenting pixels of the second image representing the additional person associated with the additional face;
determining an available location within the first image by detecting objects within the first image and identifying a portion of the first image that does not include a person; and
generating a merged image by inserting the segmented image into the available location within the first image.

19. The computer-implemented method of claim 18, further comprising:
determining ratings for the first image and the second image, and
identifying the first image as a base image into which to merge the additional person based on the first image having a higher rating than the second image.

20. The computer-implemented method of claim 18, wherein generating the facial feature vectors comprises utilizing a face detection neural network to identify the one or more faces within the first image and the additional face in the second image.

* * * * *